(12) United States Patent
Kagan et al.

(10) Patent No.: US 9,465,891 B1
(45) Date of Patent: Oct. 11, 2016

(54) TESSELLATED DATA VISUALIZATION SYSTEM

(71) Applicant: Data Cocoon LLC, Beaverton, OR (US)

(72) Inventors: Martin Kagan, Beaverton, OR (US); Gregory Houlding, Camas, WA (US); Whitney Lee Kagan, Beaverton, OR (US)

(73) Assignee: Data Cocoon LLC, Beaverton, OR (US)

( * ) Notice: Subject to any disclaimer, the term of this patent is extended or adjusted under 35 U.S.C. 154(b) by 0 days.

(21) Appl. No.: 15/141,728

(22) Filed: Apr. 28, 2016

Related U.S. Application Data

(60) Provisional application No. 62/154,644, filed on Apr. 29, 2015, provisional application No. 62/209,276, filed on Aug. 24, 2015.

(51) Int. Cl.
| | |
|---|---|
| *G06T 11/20* | (2006.01) |
| *G06F 17/30* | (2006.01) |
| *G06T 17/20* | (2006.01) |
| *G06T 17/30* | (2006.01) |
| *G06F 3/0481* | (2013.01) |

(52) U.S. Cl.
CPC ..... *G06F 17/30994* (2013.01); *G06F 3/04815* (2013.01); *G06F 17/30958* (2013.01); *G06T 11/206* (2013.01); *G06T 17/20* (2013.01); *G06T 17/30* (2013.01)

(58) Field of Classification Search
None
See application file for complete search history.

(56) References Cited

U.S. PATENT DOCUMENTS

| | | | |
|---|---|---|---|
| 5,903,255 A | 5/1999 | Busch et al. | |
| 7,071,940 B2 | 7/2006 | Malik | |
| 7,315,849 B2 | 1/2008 | Bakalash et al. | |
| 7,882,144 B1 | 2/2011 | Stolte et al. | |
| 8,260,658 B2 | 9/2012 | Fenstermaker et al. | |
| 8,856,107 B2 | 10/2014 | Mandel et al. | |
| 8,866,816 B2 | 10/2014 | Cardno | |
| 8,954,893 B2 | 2/2015 | Sayers et al. | |
| 8,972,457 B2 | 3/2015 | Stolte et al. | |
| 8,983,936 B2 | 3/2015 | Fisher et al. | |
| 9,147,273 B1 | 9/2015 | Allen et al. | |
| 9,152,693 B1 | 10/2015 | Magdalin | |
| 9,190,042 B2 | 11/2015 | Plott et al. | |
| 9,207,912 B2 | 12/2015 | Zhang et al. | |
| 9,229,609 B2 | 1/2016 | Armitage | |
| 9,245,057 B1 | 1/2016 | Fletcher et al. | |
| 9,256,970 B2 | 2/2016 | Hao et al. | |
| 9,256,971 B1 | 2/2016 | Nehring et al. | |
| 2010/0042645 A1 | 2/2010 | Bakalash et al. | |
| 2011/0219324 A1* | 9/2011 | Watanabe | G06F 3/048 715/771 |
| 2013/0246484 A1 | 9/2013 | Stolte et al. | |
| 2013/0321446 A1* | 12/2013 | Cutcher-Gershenfeld | G06T 11/206 345/589 |

(Continued)

FOREIGN PATENT DOCUMENTS

| | | | | |
|---|---|---|---|---|
| DK | WO 2008055502 A1 * | 5/2008 | ............. | G06Q 10/06 |
| EP | 1921575 A1 | 5/2008 | | |

(Continued)

*Primary Examiner* — Jacinta M Crawford
*Assistant Examiner* — Diane Wills
(74) *Attorney, Agent, or Firm* — Kolisch Hartwell, P.C.

(57) ABSTRACT

A data visualization system and related methods may include generating a multi-dimensional graphical object, in which a tessellated arrangement of columns represents an underlying hierarchical data set. Parent-child relationships may be represented by adjacency of columns with respect to an X-Y plane. Magnitudes of underlying values and/or expressions may be represented by Z-axis heights of the columns.

20 Claims, 20 Drawing Sheets

(56) References Cited

U.S. PATENT DOCUMENTS

| | | |
|---|---|---|
| 2014/0043337 A1 | 2/2014 | Cardno |
| 2014/0205973 A1* | 7/2014 | Knutson ................ G09B 19/00 434/154 |
| 2015/0074127 A1 | 3/2015 | Cherwinka et al. |
| 2015/0081356 A1 | 3/2015 | Olson et al. |
| 2015/0089422 A1 | 3/2015 | Spaulding et al. |
| 2015/0324101 A1* | 11/2015 | Roesch ............... G06F 3/04847 715/771 |
| 2015/0370877 A1 | 12/2015 | Bandera et al. |
| 2015/0378526 A1 | 12/2015 | Ramanathan et al. |
| 2015/0378563 A1 | 12/2015 | Ramanathan et al. |

FOREIGN PATENT DOCUMENTS

| | | |
|---|---|---|
| EP | 2953039 A1 | 12/2015 |
| WO | 2015188036 A1 | 12/2015 |

\* cited by examiner

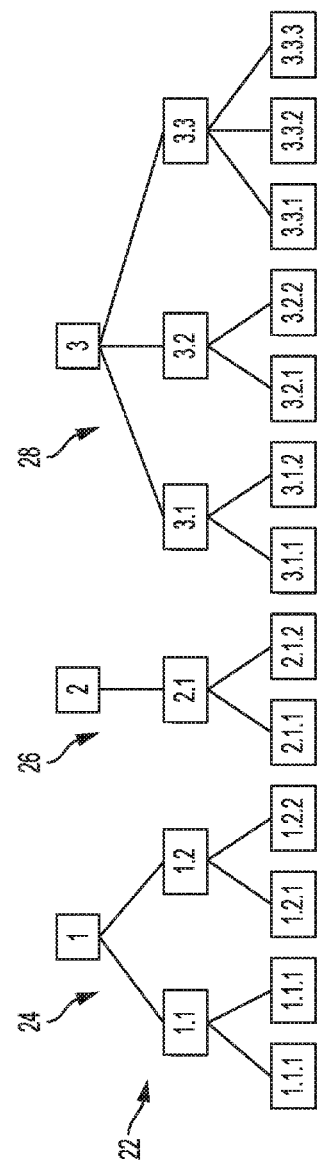

TESSELLATED DATA VISUALIZATION SYSTEM

CROSS-REFERENCES

This application is based upon and claims the benefit under 35 U.S.C. §119(e) of U.S. Provisional Patent Application Ser. No. 62/154,644 and Ser. No. 62/209,276, both of which are incorporated herein, in their entireties, for all purposes.

FIELD

This disclosure relates to systems and methods for the visual representation and analysis of data. More specifically, the disclosed embodiments relate to three-dimensional visualization of hierarchical data.

INTRODUCTION

The volume and flow rate of contemporary "big data" is of a scale that outweighs the human mind's capacity of understanding. One focal point of big data tools is data analysis, to aid in data mining and the like. However, existing tools fail to adequately address a key component: comprehensive visual analysis.

Hierarchical data, in particular, presents challenges for visual analysis. Hierarchical data is data which is organized into a tree-like structure, where any single data element may be a "parent" to one or more other data elements, each of which is a "child" to the parent. These child data elements may also be parents to one or more other data elements in a multi-generational structure. That is, any one data element may have a parent, as well as any number of children.

Data is organized into hierarchical sets in many fields and for many purposes; for example: company organizational structure, library collections, school course catalogs, patient information for hospitals, biological classifications, items in a department store, file organization structures in computers, election results, survey results, and budgeting, among many others.

Visualizing such hierarchical data sets requires methods capable of showing the parent-child relationships, the relative value of the data elements, and potentially how the data elements change over time, among other facets. No known method is capable of accurately conveying all of these aspects of a hierarchical data set, particularly in an intuitive sense that is easily understood by an untrained individual.

One known method of displaying hierarchical data is called a so-called "treemap." Treemaps display hierarchical data in two dimensions as a set of nested rectangles, with each rectangle representing a data element. The area of each rectangle corresponds to the value of the associated data element. Comparing the relative values of two data elements on opposing sides of a tree map may be difficult, as the relative size of two areas is often difficult to judge by eye, in particular when the two areas are not next to one another. Parent-child relationships may be shown using divider lines. However, these divider lines are difficult to see, particularly as one moves further down the generational ladder into the data set. Moreover, when treemap data is displayed with a time dependence, the size of each rectangle may change, as well as the relative position of a rectangle within the treemap, thus making it difficult to keep track of a particular data element over time.

Other known methods of displaying hierarchical data involve representing data elements as circles arranged in a two-dimensional plane, with the area of the circles representing the value of each data element, and sometimes including connecting lines to represent parent-child relationships. Representing value in terms of area poses challenges for humans, who can tell if one circle is larger than another but have difficulty grasping how much bigger. Adding time dependence to the area of the circles does not improve the ease with which they are understood.

SUMMARY

The present disclosure provides systems, apparatuses, and methods relating to the multi-dimensional visualization of hierarchical data. In some examples, a method, implemented in a data processing system, may include receiving, using a data processing system, one or more elements of a data set; identifying, using a processor of the data processing system, a plurality of hierarchical data nodes of the data set, each of the data nodes having an associated quantitative value, and one or more relationships between the data nodes, such that identifying the data nodes includes identifying a plurality of root nodes and one or more generations of child nodes; generating, using the data processing system, a multi-dimensional graphical object illustrating the quantitative values of the data nodes and the one or more relationships between the data nodes; wherein generating the graphical object includes: representing the plurality of root nodes as a circular, edge-to-edge cluster of columns, each such root node column having a tessellatable cross-sectional shape; representing, adjacent to a first root node of the plurality of root nodes, one or more first child nodes having the first root node as a parent, the one or more first child nodes represented as respective child node columns extending single file from one unoccupied edge of the first root node; and setting a respective height of each root node column and of each child node column, such that the respective height corresponds to the quantitative value of the data node represented by the respective column; and transmitting the graphical object for display.

Features, functions, and advantages may be achieved independently in various examples and embodiments of the present disclosure, or may be combined in yet other embodiments, further details of which can be seen with reference to the following description and drawings.

BRIEF DESCRIPTION OF THE DRAWINGS

FIG. 1 is a table of illustrative hierarchical data.

FIG. 2 is an illustrative representation of relationships between nodes in a hierarchical data structure.

DESCRIPTION

Figure 3:
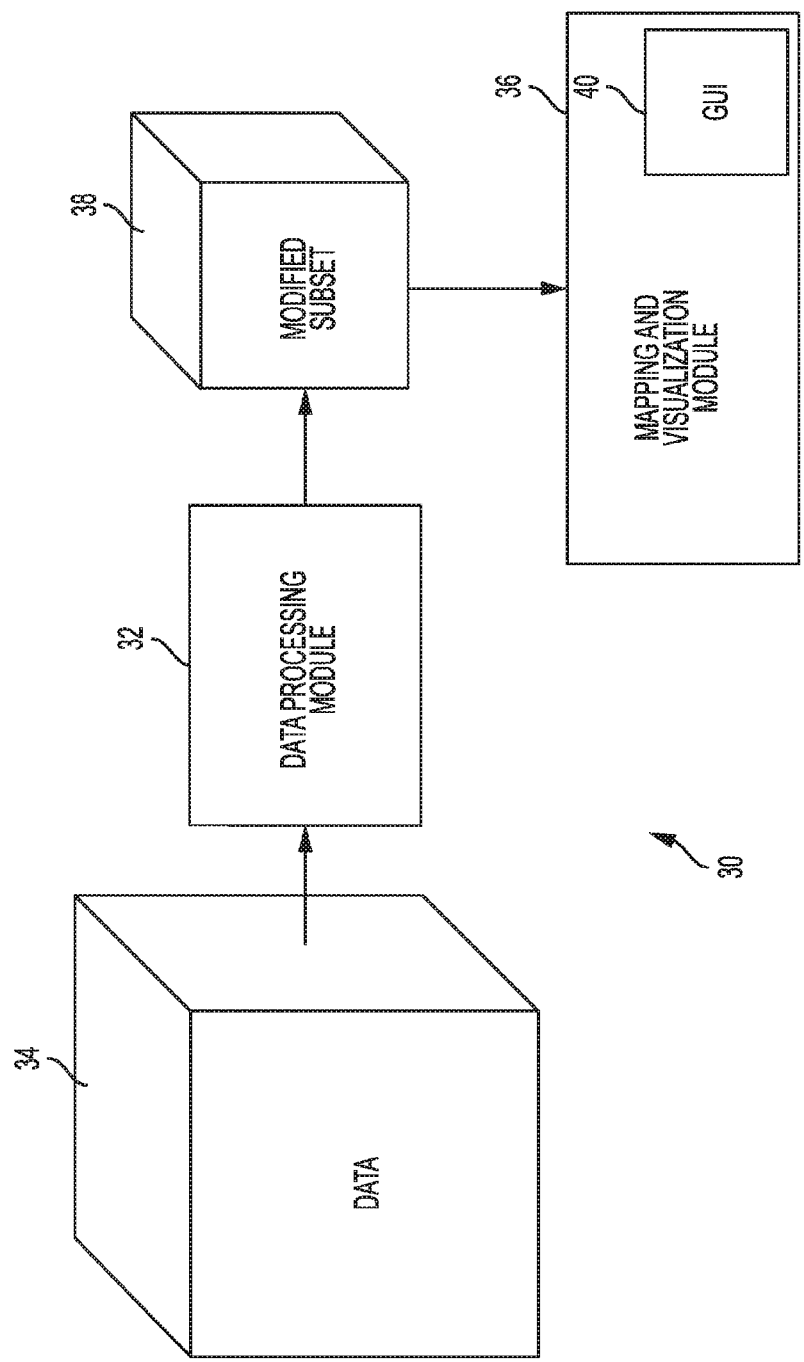
FIG. 3 is a schematic block diagram of a data visualization system in accordance with aspects of the present disclosure.

Various embodiments of a tessellated data visualization system configured to represent hierarchical data in three dimensions are described below and illustrated in the associated drawings. Unless otherwise specified, the tessellated data visualization system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other data visualization systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

DEFINITIONS

The following definitions apply herein, unless otherwise indicated.

"Substantially" means to be essentially conforming to the particular dimension, range, shape, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Directional terms such as "up," "down," "vertical," "horizontal," and the like should be understood in the context of the particular visualization topology being used. For example, a tessellated column topology may be created and oriented around defined X, Y, and Z axes. In those examples, the X-Y plane will define horizontal, with up being defined as the positive Z direction and down being defined as the negative Z direction.

OVERVIEW

Hierarchical information or data, in general, includes records or nodes of data organized in a tree-like structure (i.e., a hierarchy), where parent-child relationships are defined between the nodes and each set of child nodes combines in some meaningful way to produce their parent. Examples of hierarchical data include demographic data organized by country, state, county, municipality, etc.; business data organized by corporate entity, division, department, expense category, etc.; and individual health information, organized by health aspect, physiological system, organ, organ-related chemistry levels, etc. The traditional "org chart" of a company is an example of hierarchical organization. Almost any system that can be described hierarchically can have data associated with each level of the hierarchy. This data may comprise activities, readings, or entries occurring over time, for example as transactions in a ledger or sensor data points entered in a log. These time-based data points, however, can be categorized and rolled up to generate the nodes in a selected hierarchical data organization rubric.

For any given parent node, one or more child nodes may exist. Each parent node represents a combination of its respective child nodes. For example, the magnitude of a parent node may be equivalent to the sum of the magnitudes of its children. Each child will have no more than one parent, but each parent may have multiple children. Nodes having zero parents may be referred to as root nodes. Each level or layer of children may be referred to as a "generation."

FIG. 1 shows an illustrative example of hierarchical data, generally indicated at 10. Hierarchical data 10 is represented in a table 12. In this tabular form, an index 14 is included to identify each data element or node, as well as its relationship to other nodes. Three values 16, 18, and 20 are listed for each data element, corresponding to three different time periods T1, T2, and T3. Displaying data 10 in a table, such as table 12, may effectively communicate the values of the data elements. However, determining parent-child relationships from such a data table is difficult and cannot be taken in visually without detailed inspection.

FIG. 2 shows that hierarchical data (e.g., data 10) may be represented as a forest 22 comprising tree structures 24, 26, and 28. A tree structure such as this may effectively represent the parent-child relationships between data elements or nodes. However, the relative values (e.g., magnitudes) of the respective nodes are not easy to discern from the 2-D tree layout, even if numerically indicated on the diagram.

Human minds intuitively categorize and organize information hierarchically. To a great extent, our physiological brains are themselves organized hierarchically (see, e.g., "On Intelligence," by Jeff Hawkins (2004), or "How to Create a Mind: the Secret of Human Thought Revealed" by Ray Kurzweil (2012)). Accordingly, databases all over the world are arranged with this type of organization. As data flows into ever more affordable and ubiquitous memory stores, one or more organizational rubrics must be imposed for humans to be able to understand and use the data. More often than not, this organization is hierarchical in nature.

Generally speaking, humans are more capable and efficient at intuitively processing visual representations of data rather than reviewing the underlying data itself. However, existing methods and systems for visualizing hierarchical data are less than adequate.

Existing solutions for visualizing hierarchical data typically have one thing in common: the data is represented in a two-dimensional plane. In addition to the treemaps, circle maps, data tables, and tree structures described above, comb charts combine elements of two different two-dimensional chart types into a single two-dimensional chart. This is not a coincidence, as a prevailing view in the data visualization community is that three-dimensional representations of data can be inherently misleading. In other words, unless a person is intending to represent a three-dimensional physical object, most visualizations of data are best left in two dimensions. However, in this case the data itself is three- or even four-dimensional. As many data sets have more than two dimensions, creating a two-dimensional representation necessarily ignores one or more dimensions when creating the visualization. Often, more than one 2-D visualization is required to tell the whole story of the data set.

In the known visualization methods that do have 3-D capabilities, other shortcomings are present. In general, the spatial relationships between data points in these methods are not intuitive, and the problems of two-dimensional representations are not corrected. For example, representing data as connected spheres simply replaces the nonintuitive and inaccurate judgment of circular area with the even less intuitive and accurate judgment of spherical volume.

The various examples of tessellated data visualization systems described herein, as well as related systems and methods, solve the technical visualization problems outlined above, in part by representing the hierarchical data as an inherently three-dimensional virtual object having an intuitive, easily grasped arrangement. The hierarchical data may be modeled as a three-dimensional object on a computing device. The model may be rotated, manipulated, and/or animated by a user. Surprisingly, and against the prevailing wisdom, such a model can accurately, easily, and intuitively represent the entirety of a data set in a single visualization.

In general, as shown in FIG. 3, a data visualization system according to the present teachings, generally indicated at 30, may include a data processing module 32 coupled to a data store 34 (e.g., a database) of hierarchical data. A mapping and visualization module 36 may be coupled to the data processing module, such that the mapping and visualization module receives an output of the data processing module. An output of data processing module 32 may include a subset or modified subset 38 of the data in data store 34. Mapping and visualization module 36 may be configured to visually represent some or all of the hierarchical data (e.g., subset 38) in accordance with one or more selected topologies or visual arrangements. The representation may be displayed, for example interactively, on a graphical user interface (GUI) 40. Any or all of the components shown in FIG. 3 may be local or remote (e.g., computers and storage systems connected to a network), and/or may be located in the "cloud," (e.g., software as a service—SaaS—provided over the Web).

More specifically, data store 34 may include any suitable data store configured to store in memory the values and relationships between nodes and related data. For example, data store 34 may include data contained and organized in a relational database, such as a Microsoft Access or SQL database, one or more spreadsheets, such as Microsoft Excel or Google Sheets, JSON data objects, and/or other computer-readable file(s), or any combination of these. The hierarchical data may be stored and correlated according to standard, well-known methods in the art. For example, the data may be in the form of an array, such as an online analytical processing (OLAP) cube or hypercube, also referred to as a multidimensional dataset. Data in this form may be analyzed using typical operations, such as slicing, dicing, drilling down, drilling up, rolling up, and/or pivoting. When such a data store contains business-related information, use of these sorts of analysis tools may be referred to as Business Intelligence (BI).

Mapping and visualization module 36 may include any suitable software program or programs configured to produce three-dimensional (e.g., having height, width, and depth) and/or four-dimensional (i.e., time-based) renderings. These renderings may be referred to collectively herein as 3-D renderings. In some examples, 3-D renderings may be interactive, such that a user can manipulate the view through the user interface, e.g., by panning, rotating, zooming, selecting, and/or the like, similar in function to known computer-aided design (CAD) systems. In some embodiments, some or all of these functions are carried out using so-called geographic information systems (GIS) software for mapping, and JavaScript/WebGL for rendering. In some examples, HTML5 may be used for rendering on the Web.

GUI 40 may include any suitable user interface allowing the user to view and interact with the 3-D rendering. In some examples, GUI 40 may include any suitable mechanical or virtual user interface configured to allow an operator to communicate information to the software rendering program and/or to carry out one or more functions. For example, GUI 40 may include one or more manipulable hardware or software controls, such as a lever, dial, switch, slider, pushbutton, keypad/keyboard, mouse, touchpad, and/or knob, or the like, or any combination of these, any of which may be implemented mechanically or virtually, such as on a screen or other display. Any manipulable control may be manipulated by a body part of the operator, such as by a hand, a foot, and/or one or more fingers or toes. In some examples, a user interface may include a voice interface capable of speech recognition, through which the operator may provide voice commands to the controller. In some examples, a user interface may include a wearable computing device, such as an article of clothing or a wrist- or head-mounted interface. In some examples, a user interface may include any suitable device implanted on or in the operator's body. In some examples, a user may interact with 3-D renderings according to the present teachings via a virtual reality (VR) system (e.g., Oculus Rift, or the like), and/or an augmented reality system (e.g., Microsoft HoloLens, or the like).

Data visualizations may be rendered as static 3-D objects (e.g., on a display screen) that can be manipulated by the user, and/or as a series of visualizations (e.g., an animation) showing change over time (i.e., 4-D) or any other suitable categorization (e.g., change between departments, from individual to individual, etc.). In some examples, a user may interact with the visualized 3-D object by moving within the same virtual space as the object (e.g., using VR technology). In some examples, a data visualization may be physically reproduced using a 3-D printer. For example, a user may wish to memorialize a meaningful data set by generating a three-dimensional physical object for display on the user's desk or display shelf.

The visual topologies and GUIs described herein are a significant and substantial improvement over existing data visualization topologies and GUIs. They solve the various problems described above, notably by providing an interactive and intuitive interface for analyzing, comparing, tracking, and absorbing a spectrum or array of simple data sets and/or complex and deep data over time.

Data visualization systems in accordance with aspects of the present disclosure may be used for intuitive BI and other analyses. The data being analyzed may represent any suitable operation, system, or activity. For example, hierarchical data may represent accounting or other financial data for a company or individual, health-related information for a population or individual, climate information for one or more geographical regions, cost or durational data related to one or more work breakdown structures, etc.

Various embodiments of a tessellated data visualization system as described herein may represent nodes (i.e., data elements) of a hierarchical data set as columns arranged in a pattern (e.g., a tessellation) according to selected rules. The parent-child relationships in the data set may be represented by the relative proximity and/or arrangement of the columns. The height of the columns may be used to represent a value associated with each node. It may be simple and intuitive for a user to compare the relative heights of two columns in order to appreciate the relative value of the associated nodes in the underlying data set.

If the hierarchical data set has time-dependent data elements, a series of visualizations may be created for each data element, and then sequentially displayed so as to represent the passage of time as an animation. In some examples, an animation of the change from a first value to a second value may be presented seamlessly, e.g., as a continuous morphing from one value to the next, and/or may provide additional visual aspects to highlight the delta between the first and second values. As the relative position of each column is fixed by the parent-child relationships, the columns will not change position within the topology over time. However, the height of each column may change. Accordingly, a user may easily understand the underlying time-dependent behavior of the data set by watching the columns move up and down relative to one another over time. The user may manipulate the 3-D virtual object, e.g. by rotating it or zooming in or out on various locations. Thus, a user may gain a full appreciation for the underlying data set by viewing a representation of the entire data set from multiple angles and vantage points.

As mentioned above, several interactive topologies may be used to display a selected portion (or all) of the data. Each of the following visualization topologies is described briefly here as an overview, and described in further detail below along with other topologies and examples.

A first topology may include mapping the data as a three-dimensional tessellated spiral of geometric columns, also described as a tessellated column topology. See, e.g., FIGS. 4-5. This topology may be utilized to represent a large amount of data several generations deep. Accordingly, it may be referred to as a main or overview topology, or the like. Some or all of the columns may have a hexagonal cross section. Accordingly, this topology may be referred to herein as a hex or tessellated hex. In this topology, magnitude of any given data point (e.g., value, absolute value, delta, etc.) may be represented by a positive or negative height of a corresponding node. Change in value over time may be represented by animating the visualization to vary the heights based on the time period being represented. Such animation may be manually advanced or reversed, or played automatically, and may provide discrete, stepwise changes or continuous morphing animation, or any combination of these. As this is the main (or overview) topology, the systems described herein may be referred to generally as "tessellated data visualization systems." Often, this topology will be a starting point in the overall analysis, because it can provide a sense of the overall unique structure and behavior of the data set. Accordingly, in some examples, this may be referred to as the FINGERPRINT™ topology.

Other topologies may be used to perform further analysis, to support the main topology, or independently as intuitive visualizations in their own right. Many of these topologies may show, in a single visualization, the change in one or more nodes or expressions over time. A topology from this general category of visualizations may be referred to as a "creature." For example, a second topology may include mapping the time-based magnitudes of a given node in a spiraling staircase or stair-stepped topology, with each node value being reflected as a wedge-shaped column mapped in a cylindrical pattern. See FIG. 11. This topology may be referred to as a staircase or stair creature.

A third topology may include mapping a selected expression result as coaxial rings (i.e., each ring being an annulus) on a three-dimensional cylinder, where the radial size of each annulus represents the value of the expression for the corresponding time period. For example, an expression may be a mathematical result based on the relationship between a first parent node and a second parent node (e.g., total revenue minus cost of goods sold). See FIG. 12.

A fourth topology may include mapping a selected subset of data nodes (e.g., a set of grouped or allocated child data points) as rectangular or Bezier bars around the circumference of a three-dimensional cylinder whose long axis represents time. One or more generations of nodes may be mapped in this fashion. This topology may be referred to as a starburst, rose, data flower, tree creature, and/or the like. See FIGS. 13-15.

A fifth topology may include mapping low-level data points, in time, either linearly side-by-side or as a spoke-to-hub topology. For example, transactional, time-based data points may be mapped along a line or spoke, either as actual value or cumulatively, culminating in a corresponding endpoint or central hub column showing the total for that transaction group (e.g., account). This topology may be referred to herein as a reverse hex index (RHI) topology. See FIG. 16.

A sixth topology may include a modification of the tessellated topology described herein, where the root (or other) nodes of a set of hierarchical data are spaced from one another along a spiraling helix. The child data associated with each root node, as well as any subsequent generations, may remain in proximity to the root node according to the layout rules. This helix topology may be used to avoid collisions between lower generations of data associated with different root nodes, to show progression of a root node and the associated child data over time, to illustrate sequential processing of data, and/or to show multiple related hex creatures. See FIG. 18.

Aspects of a tessellated data visualization system may be embodied as a computer method, computer system, or computer program product. Accordingly, aspects of the tessellated data visualization system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the data visualization system may take the form of a computer program product embodied in a non-transitory computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the data visualization system may be written in one or any combination of programming languages, including an object-oriented programming language such as Java, Smalltalk, C++, and/or the like, and conventional procedural programming languages, such as the C programming language. More specifically, in some embodiments, computer program code may be written in Delphi using Embarcadero RAD Studio XE4. Graphics may be generated using Tatuk-GIS components. In some embodiments, computer program code may be developed in Embarcadero RAD Studio XE6, with graphics generated using WebGL (e.g., Three.js and D3).

The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the data visualization systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture having instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks. See the discussion of "sequential processing" below.

Any flowchart and/or block diagram in the drawings is intended to illustrate the architecture, functionality, and/or operation of possible implementations of systems, methods, and computer program products according to aspects of the data visualization system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts. With respect to the discussion of sequential processing (below), a substantially similar description applies regarding each node or combination of nodes.

Examples, Components, and Alternatives

The following sections describe selected aspects of exemplary tessellated data visualization systems as well as related systems and/or methods. The examples in these sections are intended for illustration and should not be interpreted as limiting the entire scope of the present disclosure. Each section may include one or more distinct inventions, and/or contextual or related information, function, and/or structure.

Tessellated Column Topology

Figure 4:
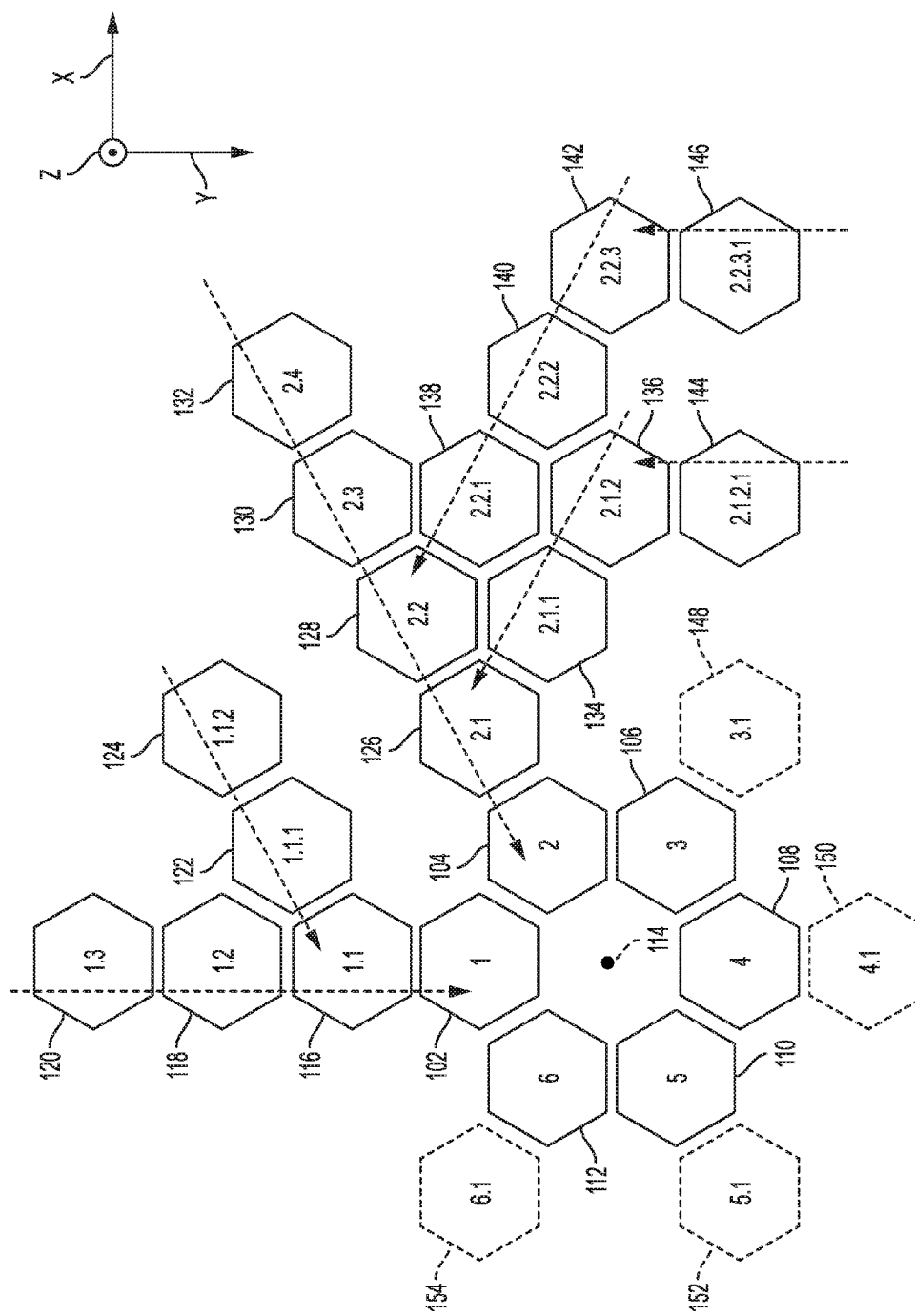
FIG. 4 is an illustrative overhead plan view of a layout for a tessellated column visualization topology in accordance with aspects of the present disclosure.

As shown in FIG. 4, this section describes various aspects of the three-dimensional, tessellated column topology described briefly above.

With reference to FIG. 4, the layout of an illustrative spiral tessellation topology will now be described. FIG. 4 is an overhead plan view of a tessellated column topology 100, showing the geometric arrangement of the topology in an X-Y plane. Note that the X, Y, and Z axes are indicated in FIG. 4 for reference purposes. In general, the topologies described in this section are configured to provide an intuitive model of hierarchical data in terms of Z-height columns that are tessellatable with respect to the X-Y plane. In this example, each of the columns is hexagonal. Each column (or the grid location where a column is disposed) may interchangeably be referred to as a node. It should be understood, and is shown in later figures, that the value or magnitude of each node is expressed as an orthogonal height (or depth) of the respective geometric column (i.e., in the Z axis).

FIG. 4 shows an arrangement of six root nodes 102, 104, 106, 108, 110, and 112, having respective indices 1-6, disposed in a contiguous circular formation, edge-to-edge, around an imaginary center point 114. Each root node represents a first-generation parent in the underlying hierarchical data set (or subset). Although a small gap is shown between node edges in FIG. 4, it should be understood that the nodes may share edges in the visualization. The six root nodes may be arranged in any order, such as in a configurable order or selected order (e.g., alphabetically, by magnitude, by underlying index value, etc.). To aid in understanding the layout and relationships between the nodes, FIG. 4 includes node labels reflecting illustrative index values.

Child data nodes are shown in relation to their respective parent nodes. For example, child nodes 116 (index 1.1), 118 (1.2), and 120 (1.3) are all children of root node 102 (1). As shown in FIG. 4, these child nodes are disposed radially with respect to node 102 and center point 114, in a single-file, edge-to-edge adjacency. Although nodes 116, 118, and 120 are shown laid out in order of their respective index values, any suitable order may be used. For example, child nodes 116, 118, and 120 may be arranged in order of descending magnitude.

In this example, child node 116 (1.1) has its own children. Accordingly child node 116 is a parent node with respect to child nodes 122 (1.1.1) and 124 (1.1.2). As mentioned above, each subsequent set of children may be referred to as a generation. To indicate the relationship between child nodes 122 and 124, those nodes are disposed radially with respect to node 116, again in a single-file, edge-to-edge adjacency. An originating edge of the parent node may be chosen such that the children extend in a clockwise (CW) or counterclockwise (CCW) direction from the respective parent. A consistent rule for this CW or CCW extension should be followed throughout any given topology/visualization. In the example of FIG. 4, the second generation extends radially from the first generation root nodes, and all children of subsequent generations extend CW from their parents.

Accordingly, child nodes 126 (2.1), 128 (2.2), 130 (2.3), and 132 (2.4) extend radially from root node 104 (2), and node 126 (2.1) is the parent of child nodes 134 (2.1.1), and 136 (2.1.2), which extend in a CW direction from their parent. Similarly, node 128 (2.2) is a parent of child nodes 138 (2.2.1), 140 (2.2.2), and 142 (2.2.3), which extend in a CW direction from their parent. Moving to the next generation, a node 144 (2.1.2.1) is the child of node 136 (2.1.2), and a node 146 (2.2.3.1) is the child of node 142 (2.2.3). These nodes, and any other children of their generation, are arranged in a fashion similar to the previous generations. Specifically, they protrude from one edge of the parent in single-file, edge-to-edge alignment, again in a CW direction when viewed from above (i.e., normal to the X-Y plane).

Although four generations of hierarchical data are discussed in this example, more or fewer may be displayed. In many cases, displaying greater than three generations (root nodes, their children, and grandchildren) can result in collisions between adjacent nodes. For example, it can be seen in FIG. 4 that a hypothetical third generation node at 2.1.4 would overlap with fourth generation node 2.2.3.1 (i.e., node 146). This situation may be addressed by analyzing no more than three generations in any given visualization, and/or by various other methods, as described below with respect to FIGS. 6, 8, and 18.

Although six root nodes are shown in FIG. 4, more or fewer may be visualized. In some examples, six node positions are available, but fewer than six are occupied. In other words, fewer than six root nodes (i.e., parent categories of data) may be displayed in a six-root-node hexagonal visualization (see, e.g., FIG. 18). In some examples, the number of root node positions may correspond exactly with the number of root nodes of data. For example, three triangular root nodes may form a complete contiguous circle around center 114 (or four square root nodes, eight octagonal root nodes, etc.).

Returning to the present example, additional child nodes 148 (3.1), 150 (4.1), 152 (5.1), and 154 (6.1) are shown (in phantom lines) with respect to the remaining root nodes (106, 108, 110, and 112), indicating that similar arrangements may be present for any or all of those nodes as well. As described above and shown in FIG. 4, the one or more children for any given parent node extend or protrude from one edge of the parent node in single file alignment.

This consistent mapping of a repeated pattern sets up a spiraling visual flow centered on the root nodes. When considered from the child or leaf nodes toward their respective parents, as indicated by the dashed arrows in FIG. 4, this flow reflects the actual flow of data as each generation is rolled up into the parent nodes. Accordingly, the layout of the visual topology graphically represents the data in an intuitive and meaningful way. A path can be identified from any leaf node, progressing hierarchically to the root node. This forms part of the intuitive nature of the data representation. An observer can easily determine which children resulted in the value observed at the parent node, as well as compare each child to the others in that generation to determine relative contributions.

Additional and/or clarifying information can be communicated via color-coding of the various nodes. For example, each set of child nodes may share a common color scheme, allowing visual separation and grouping. Moreover, each node may include corresponding indicia, which may be selected to show a category name, an index value, date-related information, magnitude, and/or the like, or any combination of these.

Although hexagonal columns are shown in FIG. 3 and elsewhere, any suitable tessellatable column shape(s) may be utilized. These shapes may be used independently or together with the hex geometry, as best suited to the data at hand. In terms of column shape, root nodes may be the same as or different than child nodes. For example, three root nodes may be represented by columns having a triangular cross section. In other examples, six central root nodes may be arranged as shown in FIG. 4, with child nodes represented as columns having a square cross section. In still other examples, eight central root nodes may be present, each with an octagonal cross section. Any suitable combination of tessellating cross-sectional shapes may be utilized.

Figure 5:
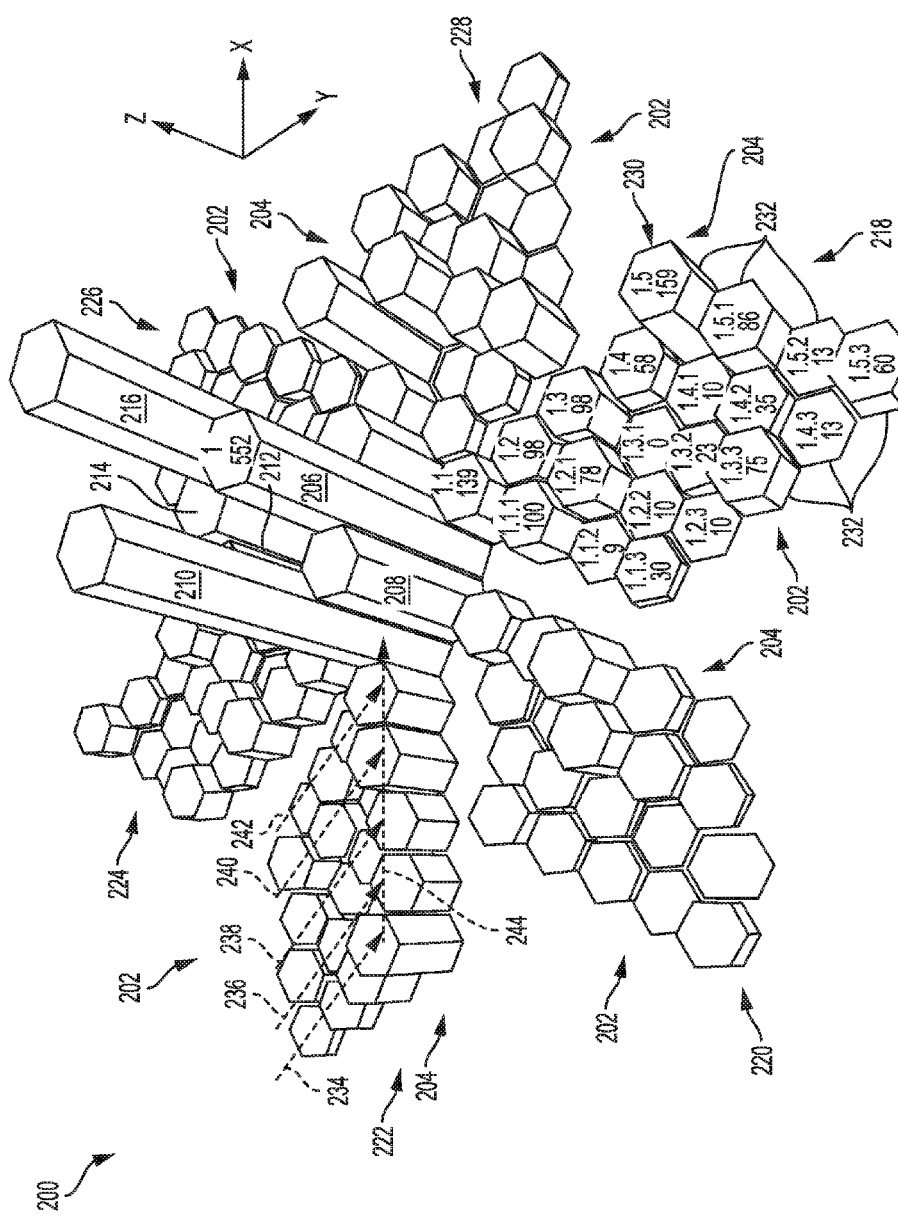
FIG. 5 is an illustrative data visualization (graphical object) using the tessellated column topology according to the present teachings.

In general, columns having a tessellatable cross section may themselves be tessellated, at least in terms of a two-dimensional "floor plan." The faces or facets of neighboring columns (corresponding to the edges of the tessellatable shapes) can be placed immediately adjacent to each other similar to what is shown in FIGS. 4 and 5. In some examples, the columns may have non-tessellatable cross sections, but may nonetheless be mapped onto a tessellated grid similar to the one described above with respect to FIG. 4. For example, cylindrical (round) columns may be mapped onto the same "floor plan" as if they were hexagonal columns, without straying from the scope of the present disclosure. In some examples, tessellatable column shapes may be arranged as if they were a different shape. For example, square cross-section columns may be represented within a hexagonal or octagonal (etc.) topology, with children extending from a parent node, for example, as if from an unoccupied edge of an imaginary hexagon shape.

Any visualization of data using a spiral tessellation topology can be shown as a static snapshot, i.e., having the values or magnitudes associated with a single time period (e.g., one column of data in FIG. 2). Additionally or alternatively, the data visualization system may be configured to load or map the data for a plurality of periods (e.g., all columns of FIG. 2) as a plurality of static visualizations. Each period may comprise a frame of an animation, such that the sequence of visualizations may be displayed as an animated series, sometimes referred to as a flipbook. The animation may be discrete or continuous, user-controlled or automatic, or any combination of these.

As will be clear after reviewing the following examples, the magnitude of the underlying (i.e., associated) data for each node is represented visually by the Z-axis height of the column at that node. As mentioned above, height may be positive and extend above the X-Y plane (i.e., "up" with respect to the X-Y plane) for magnitudes greater than zero. Likewise, height may be negative and extend below the X-Y plane (i.e., "down" with respect to the X-Y plane) for magnitudes less than zero. Of course, in some examples, the 3D visualization may be manipulated (e.g., spun, flipped, or rotated). Accordingly, up and down are relative terms corresponding to the positive and negative Z axis, respectively.

Illustrative Visualization Using Tessellated Column Topology

As shown in FIG. 5, this section describes various aspects of an illustrative tessellated column visualization 200. Visualization 200 is an example of tessellated column topology 100, described above, using hexagonal columns (also referred to herein as a "hex topology"). Accordingly, similar and/or related components may be labeled with similar reference numbers.

FIG. 5 is a perspective view of data visualization 200. Although visualization 200 is shown in perspective, it may be shown in an isometric or orthographic manner, for example, to allow more direct visual comparison of elements distant from each other within the topology. As mentioned above, values or magnitudes of each of the nodes are shown as a height on the Z axis.

Visualization 200 shows three generations of hierarchical data, laid out according to the rules described above. Third generation child nodes 202 extend CW from (or lead CCW into) their parents, second generation child nodes 204. Nodes 204 extend radially from (or lead radially into) their respective parents, which are central root nodes 206, 208, 210, 212, 214, and 216. Six spiral arms 218, 220, 222, 224, 226, and 228 extend from (or flow into) the central root nodes, such that each spiral arm is coupled to a single respective root node.

Spiral arm 218 is labeled in greater detail in FIG. 5 for illustrative purposes, to show indices and values for each node. For example, informational indicia 230 on column nodes 232 of arm 218 shows that the values of child nodes 1.5.1 (value=60), 1.5.2 (value=13), and 1.5.3 (value=86) flow into and result in (in this case, add up to) their parent node 1.5 (value=159). Each of the other arms is organized in similar fashion.

FIG. 5 includes arrows on spiral arm 222 to show the flow of information for each generation. Specifically, arrows 234, 236, 238, 240, and 242 indicate each of the third generation groups of child nodes flowing into a respective parent. These parents are themselves second generation child nodes, and arrow 244 indicates how the second generation nodes flow into their respective root node 210.

Z-Angle

Figure 6:
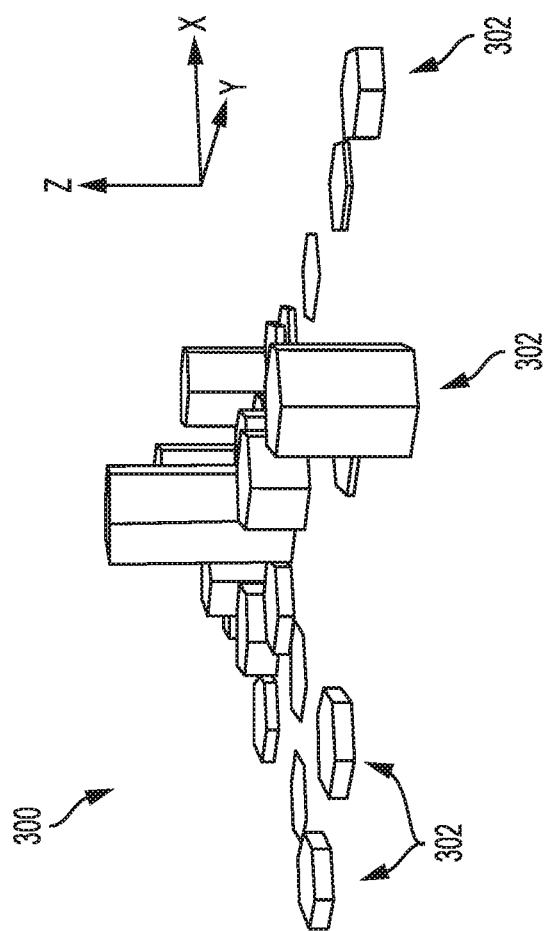
FIG. 6 is an illustrative tessellated column visualization having a downward Z-offset feature.

FIG. 6 shows a tessellated column visualization 300 having an additional feature. Visualization 300 includes a plurality of spiral arms 302. In this example, the spiral arms of the topology are each angled downward approximately 35 degrees in the −Z direction (also referred to as the Z-angle and/or Z-offset). In other words, as one moves outward from the center, each node in any given generation within a spiral arm is disposed farther below the X-Y plane as compared to the immediately previous node.

This is an optional and variable feature, selectable by the user to facilitate analysis. For example, angling of the spiral arms may be useful when one or more generations of children would otherwise cross over or interfere with one or more other nodes as described above. With the angled feature, such a circumstance would result in the series of children passing under or over the others, thereby avoiding visual ambiguity and collision. Any suitable angle may be selected, positive or negative with respect to the Z axis. In some examples, different spiral arms may be displayed at different Z-angles. For example, successively adjacent arms may alternate between a positive Z-angle and a negative Z-angle, or between a flat (zero) angle and a positive or negative angle.

Alternative Column Sub-Topologies

Figure 8:
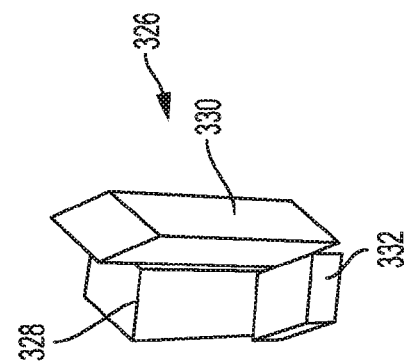
FIG. 8 is another illustrative multipartite column representation of a data node in accordance with aspects of the present disclosure.
Figure 7:
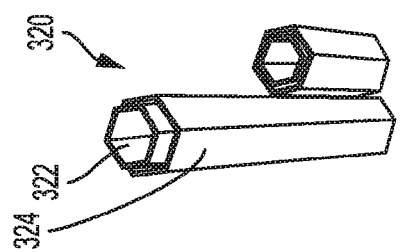
FIG. 7 is an illustrative multipartite column representation of a data node in accordance with aspects of the present disclosure.

Turning to FIGS. 7-10, alternative embodiments are partially depicted, wherein some or all of the node columns of the hex visualization may be multipartite in nature. In some examples, a column may be divided into sub-parts, such as multiple smaller subcolumns that together form the tessellatable shape. Each subcolumn could have an independently meaningful Z-height. For example, as shown in FIG. 7, a hexagonal node 320 may include two or more concentric, tubular columns, shown here as subcolumn 322 and subcolumn 324. In another example, as shown in FIG. 8, a hexagonal node 326 may include three subcolumns 328, 330, and 332, each of which has a diamond or parallelogram cross section. Each subcolumn may have a Z-height corresponding to an aspect of the overall node.

Figure 9:
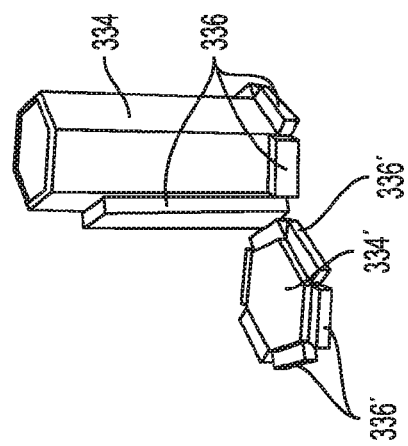
FIG. 9 is another illustrative multipartite column representation of a data node in accordance with aspects of the present disclosure.

In some examples, a full column may have adjacent side-members, which themselves have meaningful Z-heights. For example, as shown in FIG. 9, a node 334 may be hexagonal, and each side of the hexagon may include a respective rectangular side member 336. These side members may be any suitable shape and size, and may be configured to have a height in the Z direction. The general layout of the hex topology will remain intact, with side members being disposed interstitially between columns. For example, a second, adjacent column node 334' having side members 336' is shown in FIG. 9 to illustrate this point.

Each of the multiple side members or subcolumns may represent a different item or aggregation, and together may "add up" or otherwise correspond to the item represented by the node overall. For example, hex node 334 may represent revenue, and side members 336 may represent the cash, adjustments, and accrued amounts for debits and credits (totaling six pieces of information) that go into that revenue amount. Any other suitable components may be represented. For example, twelve side members may be present. In those examples, a central node that represents annual sales may have twelve corresponding side members that represent monthly sales. In this manner, a significant amount of added information can be represented in the hex visualization without diverting from the general topology, which still shows the original parent-child organization.

Figure 10:
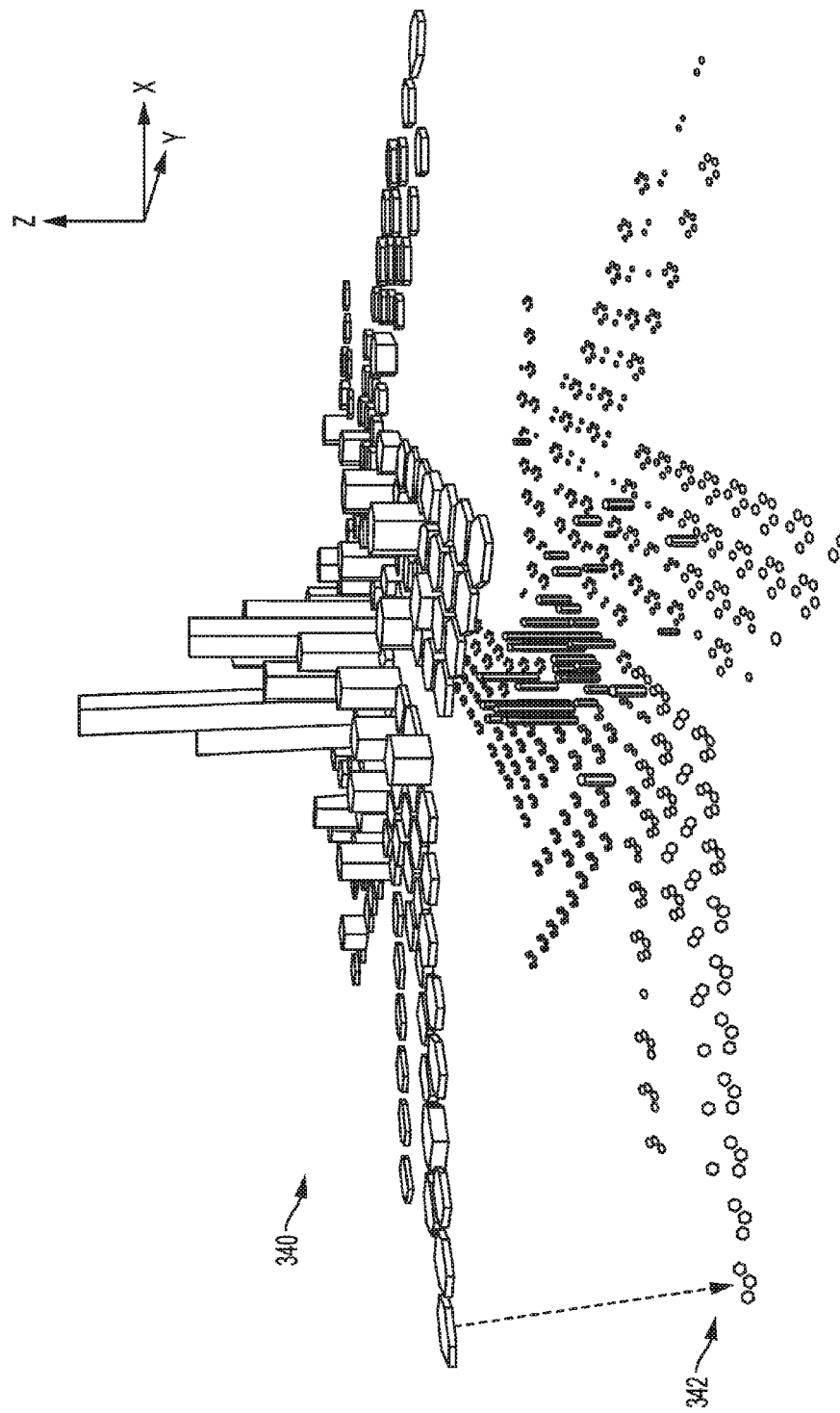
FIG. 10 is an illustrative multi-level tessellated column visualization.

In some examples, such added information may be shown separated from the main topology, but in recognizable relation to it. For example, FIG. 10 depicts a tessellated hex visualization 340. In this example, a multi-level representation is utilized to show drill-down or secondary-detail information relating to each of the hex nodes. For example, data 342 for the accounts that comprise each rolled up hex node can be shown in a vertically aligned representation, below the respective hex node.

Supporting Topologies
Drill Down:

This section describes various aspects of the supporting topologies, described briefly above, which facilitate a user "drilling down" into the data. Drilling down may allow a user to gain more detailed information about a data set, see how data evolves over time, see how relationships between data elements evolve over time, and/or any other appropriate analysis of the underlying data; see FIGS. 11-18.

In some examples described herein, the values represented in the supporting topologies may be values of data elements themselves. In some examples, the values represented may include one or more outputs of one or more expressions which have the underlying data elements as inputs. Expressions may include, for example, mathematical operations on the values of one or more data elements, mathematical combinations of data nodes, and/or the like. In some examples, the values represented may include values both of data elements and of expressions. In some examples, the values represented may vary over time.

Figure 11:
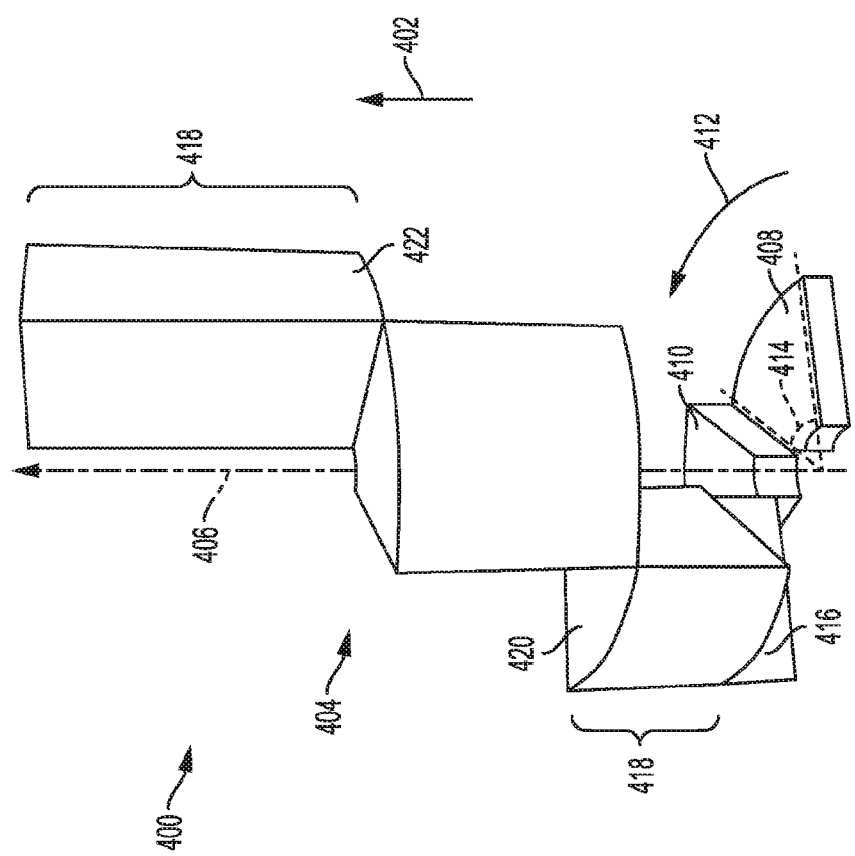
FIG. 11 is an illustrative example of data visualized using a staircase topology according to the present teachings.

FIG. 11 depicts various aspects of a staircase topology, generally indicated at 400. The staircase topology may be used to show how a single data element or node evolves over time. In this topology, time is depicted as flowing in an axial direction. In other words, time progresses generally in a direction shown vertically upward in FIG. 11, as indicated by arrow 402. Each "step" or wedge in the spiral staircase may correspond to a value of a particular data element during a time period. The height or size of each step reflects the corresponding value of the underlying data element.

Staircase topology 400 includes a plurality of steps 404 arranged in a spiraling staircase around a central axis 406. The plurality of steps may include a first step 408 corresponding to a first time interval and a second step 410 corresponding to a second time interval. Second step 410 is proximate first step 408 in a direction along the central axis of the staircase and offset from the first step in an angular direction 412 around the central axis. The second time interval may be after the first time interval. An angular extent 414 of each of the plurality of steps may be the same. Staircase 400 may proceed similarly from the second step to a third step 416, and so on.

A magnitude 418 of each of the data elements (e.g., nodes) underlying the plurality of steps 404 is indicated by an axial extent of that step along central axis 406. In the example staircase topology shown in FIG. 11, magnitude 418 of a fourth step 420 is less than the magnitude of a sixth step 422, indicating that the value of the data element is larger during the sixth time interval than during the fourth time interval.

Staircase topology 400 allows a user of the data visualization system to see in one 3-D image how a single data element evolves over time. A data visualization system may be configured to generate two or more staircase topologies, each corresponding to a different data element, to compare the evolution of the two or more underlying data elements.

For example, an underlying data set may correspond to election results for a plurality of past elections. The staircase topology may be used to show the total number of votes for the Democratic presidential nominee in a particular county over a number of previous elections. A second, similar staircase may show the corresponding data for the Republican presidential nominee in the same county, allowing for side-by-side comparison of the results over time.

Once staircase creature 400 has been created, a user may manipulate an image of the staircase, e.g., using a graphical user interface, by rotating the staircase or zooming in or out on a particular aspect of the staircase. Viewing the staircase from more than one vantage point may give a user a better appreciation for the time evolution of the underlying data element.

Figure 12:
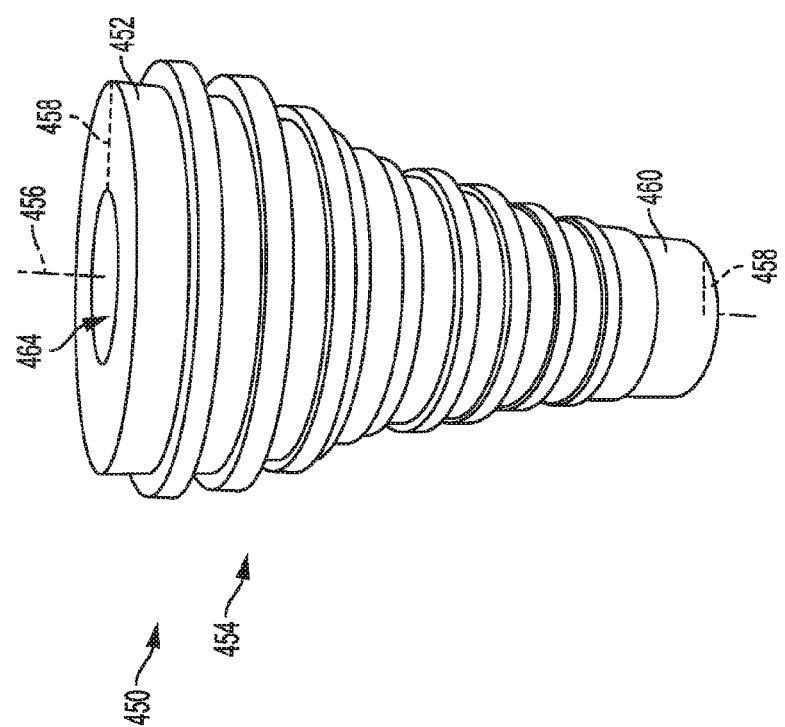
FIG. 12 is an illustrative example of data visualized using a stacked annular topology according to the present teachings.

Turning to FIG. 12, an annular or circular topology is generally indicated at 450. Similar to the staircase topology, the annular topology may be used to show how a single data element or node changes over time. Time progresses regularly along a vertical direction, indicated by arrow 452.

Alternately, as described above, the annular topology may be used to show how an expression based on the underlying data set changes over time. For example, an expression may be a mathematical result based on the relationship between a first parent node and a second parent node, such as total revenue minus cost of goods sold. In this way, the change in the expression can be observed over time in a representation that is static with respect to time.

The annular topology 450 may include a plurality of annular rings 454. Each ring may correspond to a value of a particular data element or expression during a time interval, with each ring sized to reflect the corresponding value of the node or expression. Each subsequent ring may be stacked on top of the previous ring such that the rings are coaxial along a central axis 456.

A magnitude 458 of each of the plurality of annular rings 454 may be indicated by a radial extent of the annular ring away from the central axis 456. In the exemplary annular topology shown in FIG. 12, the magnitude 458 of a first annular ring 460 is less than the magnitude of a subsequent nth annular ring 462, indicating that the value of the underlying data element or expression has grown with time.

Each of the plurality of annular rings 454 may be an annulus with a hole 464 centered on central axis 456. Alternately, each of the plurality of rings 454 may be a solid disk without the central hole.

Similarly to the staircase topology described in reference to FIG. 11, the annular topology may allow the user of a data visualization system to see in one image how a single data element or expression evolves over time. Furthermore, viewing two or more annular topologies side-by-side may allow a user to compare the time evolution of the two or more underlying data elements or expressions.

Once an annular creature 450 has been created, a user may manipulate an image of the annular creature, perhaps by a graphical user interface, by rotating the creature or zooming in or out on a particular aspect of the creature. Viewing the annular creature from more than one vantage point may give a user a better appreciation for the time evolution of the underlying data element or expression.

Figure 13:
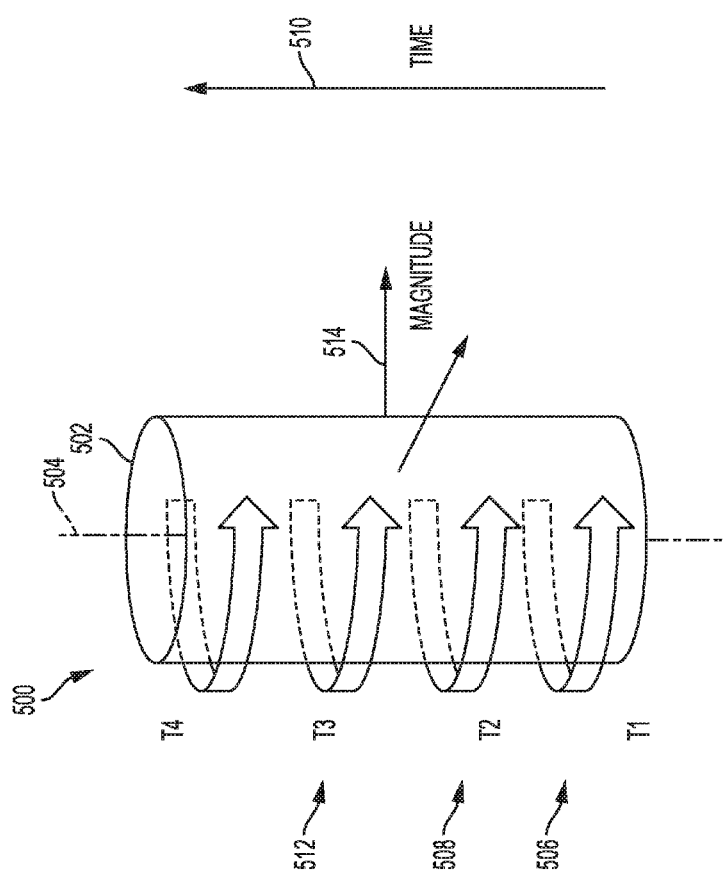
FIG. 13 is a schematic diagram showing characteristics of an illustrative data flower or rose topology in accordance with aspects of the present disclosure.
Figure 14:
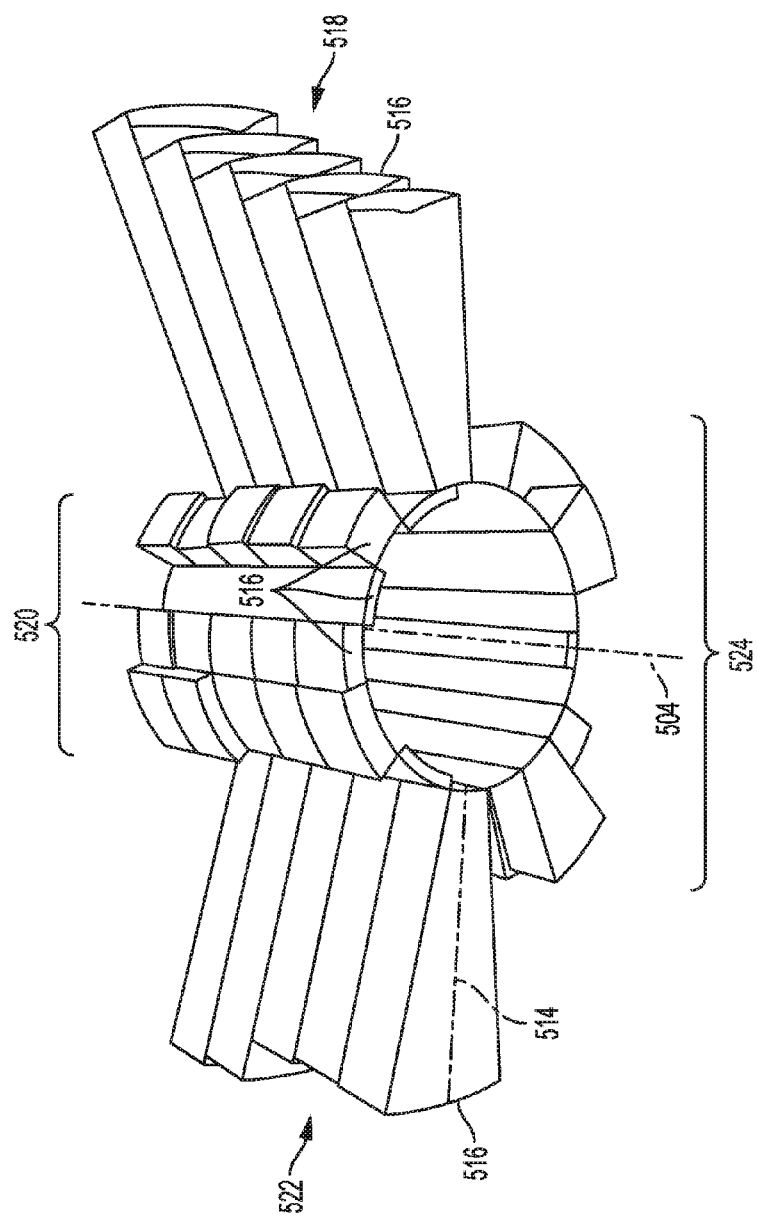
FIG. 14 is an illustrative example of data visualized using a data flower topology in accordance with aspects of the present disclosure.

FIGS. 13 and 14 depict various aspects of the fourth topology, also referred to as the starburst or data flower topology, generally indicated at 500. FIG. 13 depicts the layout of the topology and FIG. 14 depicts an illustrative embodiment. Data flower topology 500 may be used to show how related nodes or data elements change over time in a single, static representation. For example, a set of related nodes from a hierarchical data set at a first time may be mapped around the circumference of a cylinder 502 having a long axis 504 at a first axial location 506. The same set of related nodes at a second time after the first time may be mapped around the circumference of the cylinder at a second axial location 508 offset from (e.g., above) the first location. That is, the data flower topology may generally show time along an axial direction, indicated by arrow 510, substantially parallel to central long axis 504 of cylinder 502. The second time may be followed along the long axis by a third time at a third axial location 512, and so on.

A magnitude or value 514 of each data element at a given time may be represented as the radial length or extent of a protruding element 516 away from the long axis 504 of the cylinder 502. Positive values may be represented as protruding elements extending away from the cylinder, and negative values may be represented as protruding elements extending toward the central axis. Any appropriate number of data elements may be represented around cylinder 502.

In the illustrative data flower shown in FIG. 14, a first parent node 518 and an associated first set of child data nodes, generally indicated at 520, are mapped onto cylinder 502. A second parent node 522 and an associated second set of child data nodes, generally indicated at 524, are also mapped onto the cylinder. Any appropriate number of parent nodes and their children may be mapped onto the cylinder. First and second parent nodes 518 and 522 may be siblings having a common parent node (not shown in FIG. 14), or they may be unrelated. In some examples, a data flower creature may include only data elements of a single generation of hierarchical data.

The data flower topology may allow a user of a hierarchical data visualization system to see in one static image how a related set of data elements evolves over time. Once a data flower creature 500 has been created, a user may manipulate an image of the data flower, perhaps by a graphical user interface, by rotating the data flower or zooming in or out on a particular aspect of the data flower. Viewing the data flower creature from more than one vantage point may give a user a better appreciation for the time evolution of the underlying data elements.

Figure 15:
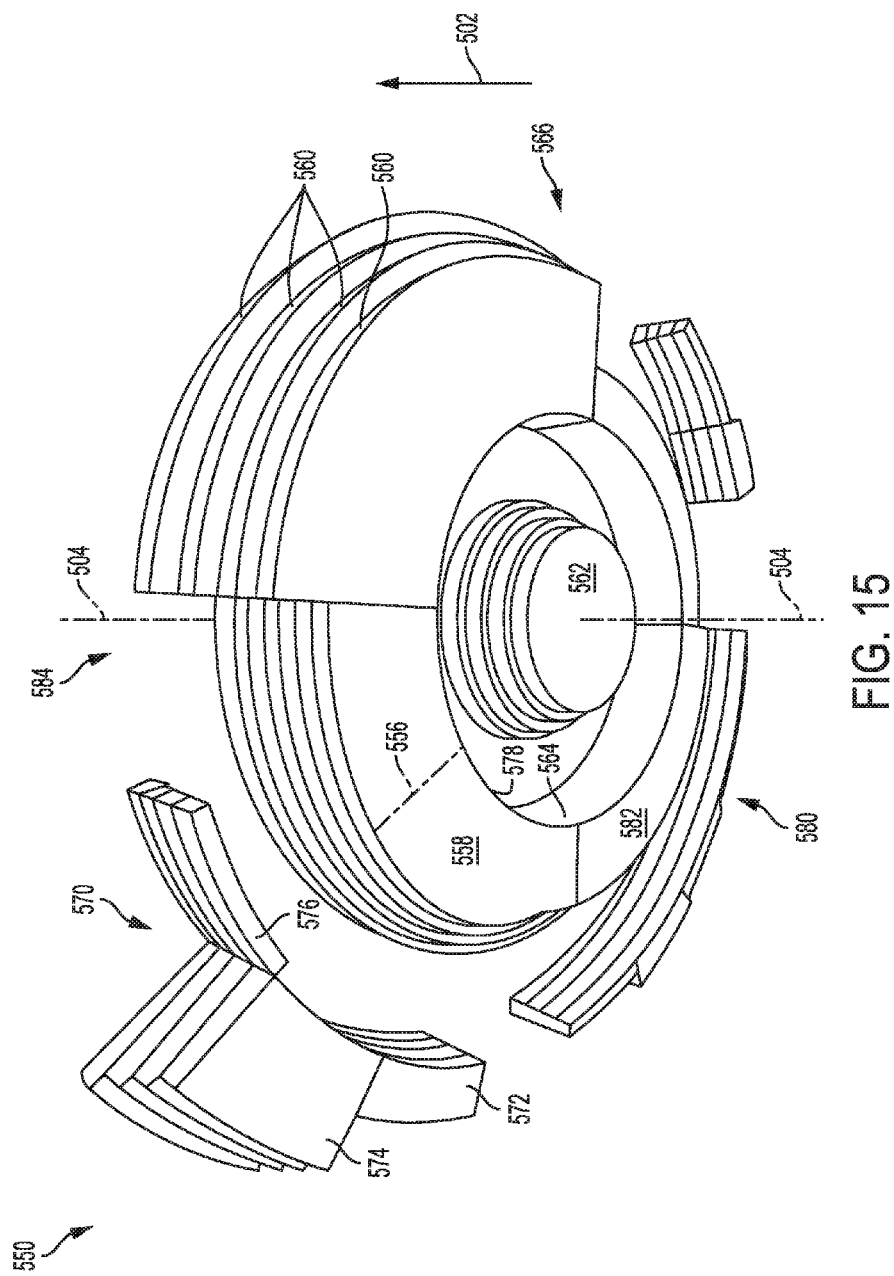
FIG. 15 is an illustrative example of data visualized using a rose topology in accordance with aspects of the present disclosure.

FIG. 15 depicts various aspects of the topology referred to as a rose, generally indicated at 550. Rose topology 550 may be used to show how more than one generation of hierarchical data evolves over time. In this topology, time progresses axially, as indicated by arrow 552, generally parallel to a central axis 554. Similar to the data flower creature, a magnitude 556 of a data element may be indicated in the rose topology by the radial or annular dimension of a protruding element 558 as measured from the central axis.

Rose topology 550 may include a plurality of levels 560. Each level 560 may be generally perpendicular to central axis 554 and may correspond to a time interval. The plurality of levels may be spaced from one another along the central axis, for example the levels may be stacked sequentially along the central axis. Each level 560 may optionally include a central disk 562 having central axis 554 as a symmetry axis, which may represent a parent node, an expression comprising one or more nodes, or any other suitable information.

The rose topology may include a first reference cylinder 564 aligned to central axis 554. First reference cylinder 564 may be similar to cylinder 502 in the data flower topology described in reference to FIGS. 13 and 14. A set of data nodes 566 may be mapped around the circumference of the first reference cylinder. For example, if the central disk 562 represents a node, the other nodes mapped around the circumference of the first reference cylinder may be the children of that central node. In another example, if a central disk is not included, the nodes mapped onto the first reference cylinder may be an unrelated set of parent nodes.

Each level 560 of the rose topology 550 may represent a set of data nodes at a different time. First reference cylinder 564 of the rose topology, along with the values represented on the first cylinder, may be similar to the data flower topology 500 described in reference to FIGS. 13 and 14.

The rose topology may include a second reference cylinder 568 aligned to central axis 554 (i.e., concentric with cylinder 562) and having a larger radius than the first cylinder. A second set of data elements 570 may be mapped around the circumference of the second reference cylinder. The second data elements mapped to the second reference cylinder 568 may be of a later generation than the data elements mapped to the first reference cylinder 564. In other words, second data elements 570 may be the children of data elements 566. Each data element 566 mapped onto the first reference cylinder may define an angular extent for the family of data associated with that data element. In the example rose topology shown in FIG. 15, there are four data elements 566 mapped to first reference cylinder 564, and each of these data elements spans ninety degrees around central axis 554. The children of each parent data element may span the same angular extent as their parent. For example, child data elements 572, 574, and 576 are children to data element 578 and are aligned angularly with data element 578. Similarly, child data elements generally indicated at 580 are aligned with their parent data element 582.

As with the data flower topology described above, positive values of data elements in the rose topology 550 may be represented as protruding elements extending away from the central axis and negative values represented as extending toward the central axis. In the example rose topology shown in FIG. 15, child data element 574 has a positive value and child data element 576 has a negative value. If a particular data element has a value of zero, a blank space may be left to indicate the zero value. For example, child data elements 572, 574, and 576 may have a sibling with a value of zero, indicated by empty space 584.

Rose topology 550 may accommodate any number of generations of hierarchical data. For example, a third generation of data may be represented on a third coaxial/concentric cylinder similar to the second generation of data mapped to second reference cylinder 568. If data element 574 has children of its own, those child data elements may be mapped onto the third cylinder within the same angular span as data element 574. Any number of cylinders of increasing radii may be included in the rose topology.

Rose topology 550 may allow a user of a hierarchical data visualization system to see, in one 3-D image, how the members of a generation of data elements relate to one another, how that generation relates to subsequent or previous generations, and how those data elements change with time. After rose creature 550 has been generated, a user may manipulate an image of the rose, perhaps by a graphical user interface, by rotating the rose or zooming in or out on a particular aspect of the rose. Viewing the rose from more than one vantage point may give a user a better appreciation for the time evolution of the underlying data elements.

Figure 16:
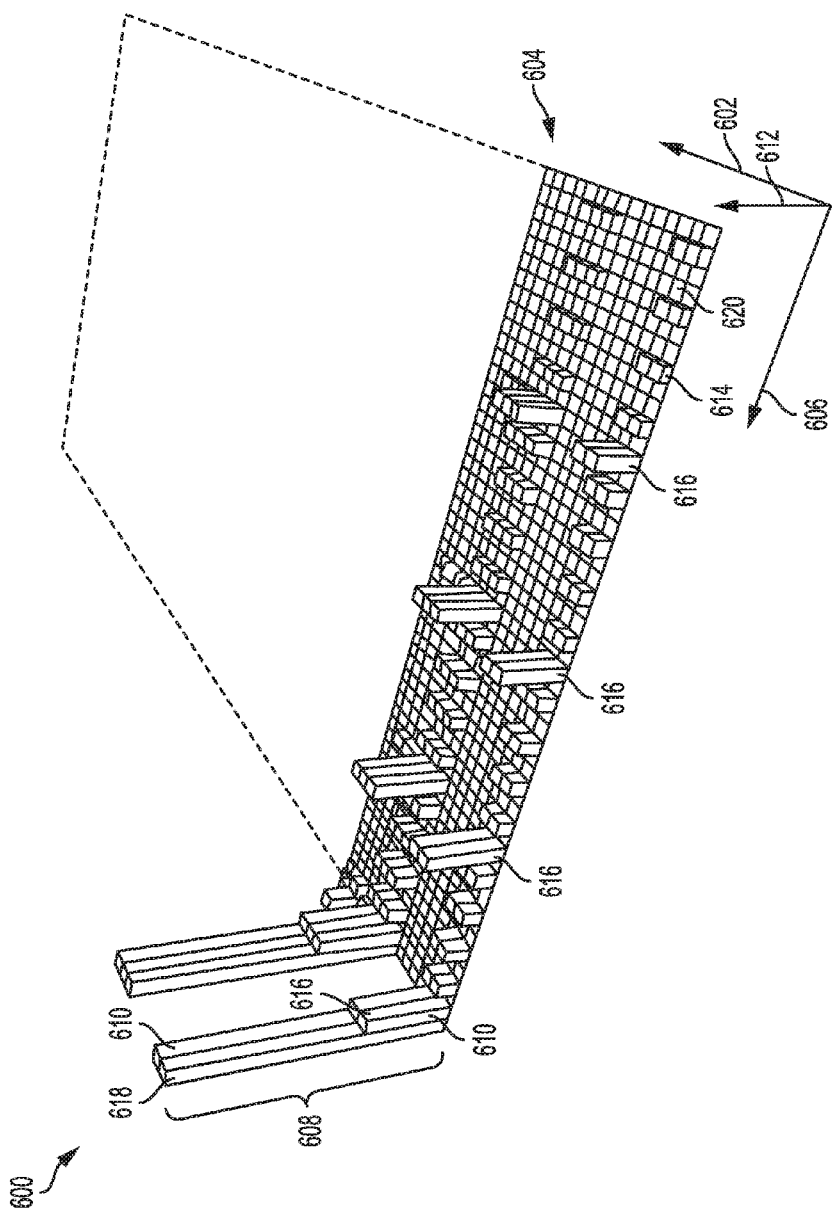
FIG. 16 is an illustrative example of data visualized using a reverse hex index topology according to the present teachings.

FIG. 16 depicts various aspects of a topology referred to as the reverse hex index (RHI) topology, generally indicated at 600. The RHI topology may be used to show how the values of related nodes or data elements change over time in a single, static representation. For example, a set of related nodes from a hierarchical data set at a first time may be mapped along a first horizontal axis 602 of a rectangular grid pattern 604. The same set of related nodes at a second time after the first time may be mapped along the first horizontal axis 602 of grid 604 but spaced along a second horizontal axis 606. That is, in the RHI topology, time may progress generally along the second horizontal axis 606. The second time may be followed along the second horizontal axis 606 by a third time, and so on.

A magnitude or value 608 of each data element may be represented as a linear height of a column or bar 610 above the grid pattern 604 along a vertical axis 612. Any appropriate number of data elements may be represented along the first horizontal axis 602. The represented data elements may include related data elements of one or more generations of hierarchical data or may include unrelated data elements.

Time may or may not proceed strictly linearly along the second horizontal axis 606. In one example, a data element 614 may indicate the amount of money a couple spends on food in a given week. Every twelve weeks along the second horizontal axis 606 may be an intermediate data element 616 indicating the sum total of food expenditures during the preceding twelve weeks. After four intermediate data elements have been shown a total year data element 618 may show the sum total of food expenditures 618 being the additive sum of the four intermediate data elements 616. That is, time may proceed generally along the second horizontal axis 606 with interludes or interruptions for the accumulating of data. An adjacent row 620 in the RHI topology may represent the time evolution of a related data element. For example, row 620 may represent the couple's weekly expenditures on fuel. In another example, row 620 may represent the couple's weekly expenditures on food from the previous year, thereby allowing for a side-by-side comparison.

The RHI topology may allow a user of a hierarchical data visualization system to see in one image how a related set of data elements evolves over time. Once an RHI creature 600 has been created, a user may manipulate an image of the creature, perhaps by a graphical user interface, by rotating the creature or zooming in or out on a particular aspect of the creature. Viewing the RHI creature from more than one vantage point may give a user a better appreciation for the time evolution of the underlying data elements.

Figure 17:
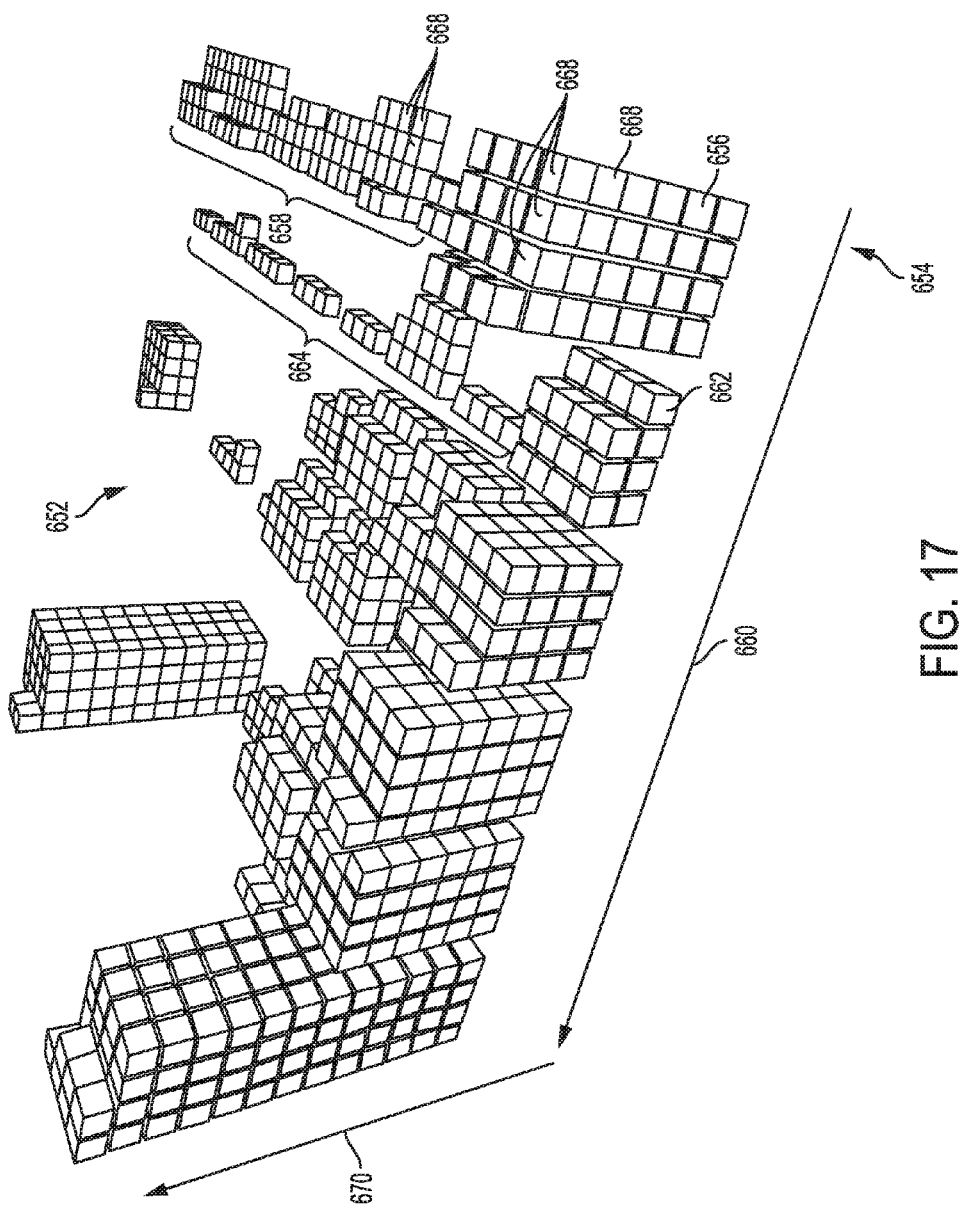
FIG. 17 is an illustrative example of data visualized using a building topology according to the present teachings.

FIG. 17 depicts various aspects of a topology referred to as the building topology, generally indicated at 650. The building topology may be used to show the values of one or more parent data elements or nodes and up to one generation of child data for each parent node. For example, a rectangular grid pattern 652 may include a first row 654 representing a first set of underlying data elements. The first row may include a first building 656 representing a first parent node and a plurality of child buildings 658 representing the child nodes of the parent node. The grid pattern 652 may include a second row 660 representing a second set of underlying data elements including a second parent node 662 and the associated child nodes 664, etc.

Each building in the building topology may be divided into a regular pattern of three dimensional blocks 668, each of which may represent an appropriate value. A magnitude or value of each data element represented by a building may correspond to a number of consistently-sized blocks 668 included in the building. Although this method may introduce rounding errors, the block size and parameters may be selected based on permissible rounding error or other factors.

Each of the buildings may have a common footprint of blocks. For example, in the exemplary building topology shown in FIG. 17, each building has a four-by-four footprint of blocks 668 on the rectangular grid pattern 652. The blocks may represent value only, or may have a particular meaning based on their disposition within the footprint. For example, a building may have a three-by-four footprint of twelve blocks, with each block representing a value associated with a month of the year. The magnitude of each data element may be roughly estimated by a vertical extent of each building along a vertical axis 670 disposed perpendicular to the grid pattern. Blocks 668 are shown as cubes in this example, but may have any suitable size or shape. For example, blocks 668 may be rectangularly cuboidal.

Building topology 650 may be used to show cumulative value of data elements. For example, child data elements 658, 664, etc. may be independent data elements, and the associated parent data elements 658, 662, etc., may be the sum of the associated children. The use of blocks 668 to indicate value may make such a representation particularly intuitive for a user of a hierarchical data visualization system.

Building topology 650 may represent a time slice of a hierarchal data set. Similar building topologies may be created to represent the same underlying data elements at later or earlier times. Time evolution of the underlying data set may be displayed as an animation of these building topologies, with the height of each building and/or the number of blocks 668 included in each building changing with time during the animation. If one or more building topologies have been created, a user may manipulate an image of the buildings, e.g., by a graphical user interface, by rotating the pattern or zooming in or out on a particular aspect of the pattern. Viewing the building topology from more than one vantage point may give a user a better appreciation for the parent-child relationships of the underlying data elements, potentially even the time dependence of those relationships.

Drill Up:

This section describes various aspects of a helix topology, described briefly above, which may allow a user to further manipulate, interact with, and/or "drill up" with respect to a data set. The helix topology may be used to appreciate how various data elements are related to one another on a larger scale, show a progression over time, perform sequential processing of data, and/or any other appropriate analysis of the underlying data; see FIG. 18.

Figure 18:
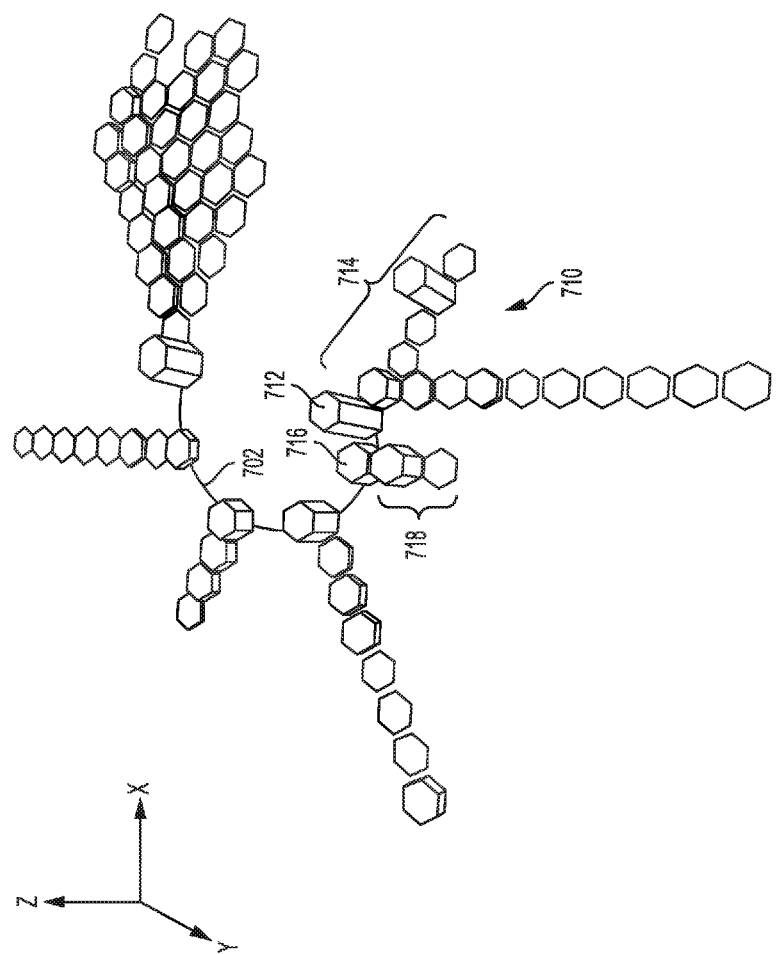
FIG. 18 is an illustrative example of data visualized using a helix topology according to the present teachings.

FIG. 18 depicts various aspects of the helix topology, generally indicated at 700. The helix topology may show progression of a root node and the associated child data over time, may illustrate and/or facilitate sequential processing of data, and/or may show multiple related hex visualizations, among others.

Helix topology 700 may show related sets of data elements as spaced along a spiraling helix 702. Helix 702 spirals along the Z axis and has either a constant or expanding radius in the X-Y dimension. Accordingly, helix 702 may have a constant radius as viewed along a vertical axis 704 or may have an increasing or decreasing radius. That is, projecting helix 702 into the X-Y (i.e., horizontal) plane may yield a circle or a spiral.

In some examples, helix topology 700 may be used to expand or spread out the elements of a hex topology, such as visualization 200 (see FIG. 5). The spatial relationships (e.g., edge to edge) between a parent node and the associated generations of children may be the same as in a non-expanded hex topology, but each spiral arm (also referred to as a branch or family) may be spaced from the other arms along the helix 702. The helix 702 may intersect each branch at a parent node. Separating the respective branches along the helix may allow each branch to include more generations of data than in a standard hex visualization without adjacent branches colliding with one another.

In some examples, helix topology 700 may be used to show progression (e.g., over time) of a single spiral arm of a hex visualization. For example, the helix topology may be used to show how the values of a family of nodes or data elements change over time in a single, static representation, as opposed to an animation or flipbook-style interaction.

In some examples, helix topology 700 may be used to show multiple related hex visualizations. Instead of having arms of a single hex topology spaced along helix 702, entire hex topologies may be spaced along helix 702. These whole hex tolopogies may represent related sets of hierarchical data or may represent a time- or other variable-based evolution of one set of hierarchal data. That is, the helix topology may be used to show how the values of an entire hierarchal data set changes over time in a single, non-animated, interactive, 3-D representation.

In some examples, helix topology 700 may be used to illustrate of facilitate the sequential processing of data. In addition to representing and/or storing hierarchical data, tessellated data visualization systems according to the present teachings may illustrate and/or be used as hierarchical decision or processing machines. For example, each node may include executable instruction(s) (e.g., a decision engine) configurable to produce a solution or output based on inputs from one or more other nodes.

When used in this manner, a tessellated system may be considered a data processor and/or decision tree. A plurality of outer nodes in a hex data visualization, for example, may coalesce or otherwise converge on a central "answer" or set of results of the program at the root nodes. Multiple hex data visualizations (or portions thereof) may be stacked or otherwise connected to each other (e.g., in a helix), such that the output of one hex level is utilized as an input at the next hex level.

For example, an arm 710 of a helix visualization may include a parent node 712 and associated generations of children 714. Parent node 712 may be a calculated value and the associated generations of children 714 may comprise data that was used to calculate the value 712. A subsequent parent node 716 may depend on its own child data 718 as well as the calculated value 712. The dependency of parent node 716 on parent node 712 may be established and/or represented by the intersection of helix 702 with both parent nodes. Thus, a sequential processing of data, where calculations depend on the results of previously made calculations, may be represented by the helix topology.

In some examples, a calculation that results in a value for a parent node may be associated with a child node during a later calculation. In these cases, helix 702 may establish and/or illustrate the situation by intersecting a branch of the helix topology at the child node in question, rather than at the parent node.

In light of the above description, it should be seen that each node may comprise an array of properties and functions, and that subsets of these properties and functions may be called upon, depending on the selected modality or functionality desired. In other words, each node or element of the present disclosure may be versatile in an object-oriented sense, in that it can morph between visual, computational, logical, structural, and/or modular functionality.

Once a helix visualization 700 has been created, a user may manipulate an image of the helix, e.g., using a graphical user interface, by rotating the helix or zooming in or out on a particular aspect of the helix. Viewing the helix from more than one vantage point may give a user a better appreciation for the relationships of the underlying data elements. As with other topologies described herein, multiple helix visualizations may be created and presented as an animation, e.g., to indicate the passage of time.

Illustrative Algorithm to Process and Visualize Hierarchical Data

Figure 19:
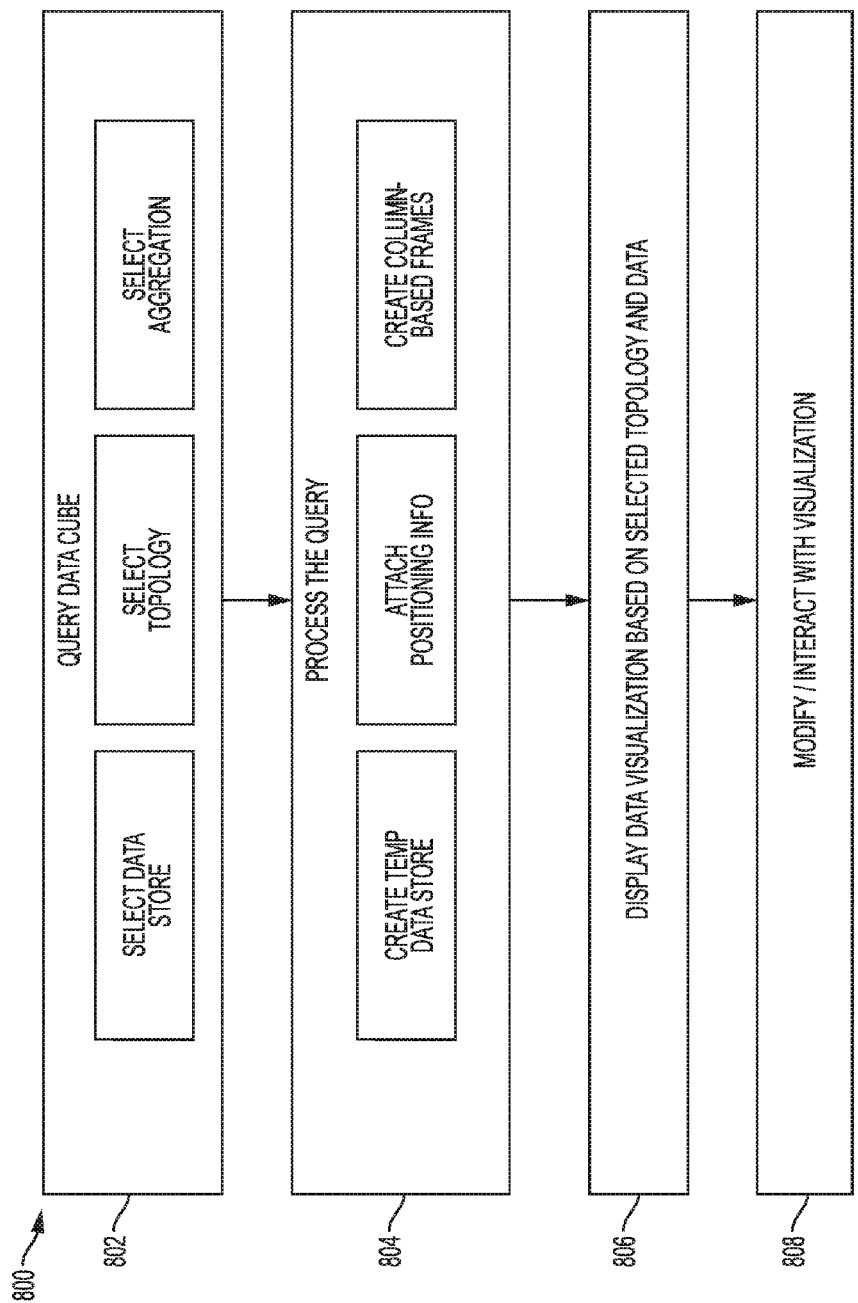
FIG. 19 is a flow chart depicting steps in an illustrative data visualization method in accordance with aspects of the present disclosure.

This section describes a method for processing and visualizing hierarchical data; see FIG. 19. Aspects of tessellated data visualization systems (see above descriptions), data processing systems, and/or computer network systems may be utilized in the method steps described below. Where appropriate, reference may be made to components and systems (described herein) that may be used in carrying out each step. These references are for illustration, and are not intended to limit the possible ways of carrying out any particular step of the method.

FIG. 19 is a flowchart illustrating operations performed by one embodiment, and may not recite the complete process or all steps of the program. FIG. 19 depicts multiple steps of a method, generally indicated at 800, which may be performed in conjunction with data visualization systems according to aspects of the present disclosure. Although various steps of method 800 are described below and depicted in FIG. 19, the steps need not necessarily all be performed, and in some cases may be performed in a different order than the order shown. In some examples, one or more steps from method 800 may be performed in conjunction with one or more steps from methods 900 and/or 1000, described below.

The following steps are configured to be performed at least in part by a data processing system and/or at least in part by a computer network (see FIGS. 21 and 22, and detailed descriptions below). Accordingly, they may be interpreted as programmed instructions to be executed by one or more processors. Data being operated on may be disposed at a local or remote data store.

At step 802, an existing data cube or multidimensional dataset is queried and data is received. For example a visualization system processor may query a data store containing a dataset. The dataset may contain hierarchical data, and/or data otherwise capable of being aggregated into a hierarchical structure, such as one or more data trees. This step may include selecting from a plurality of possible data stores and/or cubes.

Step 802 may include selecting a desired topology (e.g., basic tessellated hex with 30-degree Z-offset, etc.). In some examples, topology selection may be performed as a separate step, a later step, or as a pre-selected option, default setting, or the like, performed outside of method 800.

Step 802 may include selecting an aggregation method. For example, data from the dataset may be aggregated as one or more summations, average values, cumulative values, etc. Note that aggregation, as used herein, may include combinations of and/or calculations based on the data, and may include relative value, delta (e.g., change in value), percent, cumulative, and the like, or any combination of these.

At step 804, the queried data from step 802 is processed according to the selections of step 802, thereby aggregating and/or consolidating and/or allocating the data to form a second data cube. Step 804 may include generating a temporary data store for storing the second data cube.

Step 804 may include attaching a respective index and/or positioning information to each node or data element. In other words, the selected topology may define a set of possible positions (e.g., node locations in a tessellated hex grid/map or on an imaginary rose cylinder). Each data node may be assigned a position on the grid, e.g., based on its relationship to other points. For example, in a tessellated column visualization, root nodes will be assigned the central positions, first level children will be assigned adjacent to the root nodes, etc.

Step 804 may include generation of height information for each node, e.g., corresponding to the magnitude or other aspect of the data underlying the node. As described above, height information may correspond to the Z-axis for a tessellated column creature, the radial dimension for a rose creature, etc., and may be positive or negative depending on the underlying value being represented.

Step 804 may include, e.g., if an animation is desired, generation of multiple "frames" of the height information, such that sequential display of the heights will result in an animation of the information over time (or over whatever index corresponds to the different magnitudes for the same node, typically shown in a table as column headings).

At step 806, one or more aspects of the data visualization may be displayed in two, three, and/or four dimensions, on a graphical user interface (GUI) or other (e.g., holographic) display, based on the selected topology and the aggregated data.

At step 808, a user may optionally modify and/or otherwise interact with the visualization to enhance analysis and understanding. For example, additional topologies may be selected and activated to drill down or otherwise display secondary information. Data may be visualized as a series of frames that are playable as an animation. The animation may play as a video and/or in stepwise fashion under the user's control. Additional visual controls may be available, such as magnification/zoom, rotation, panning, revolution, inversion, and the like, or any combination of these.

Illustrative Algorithm to Generate Tessellated Column Topology

Figure 20:
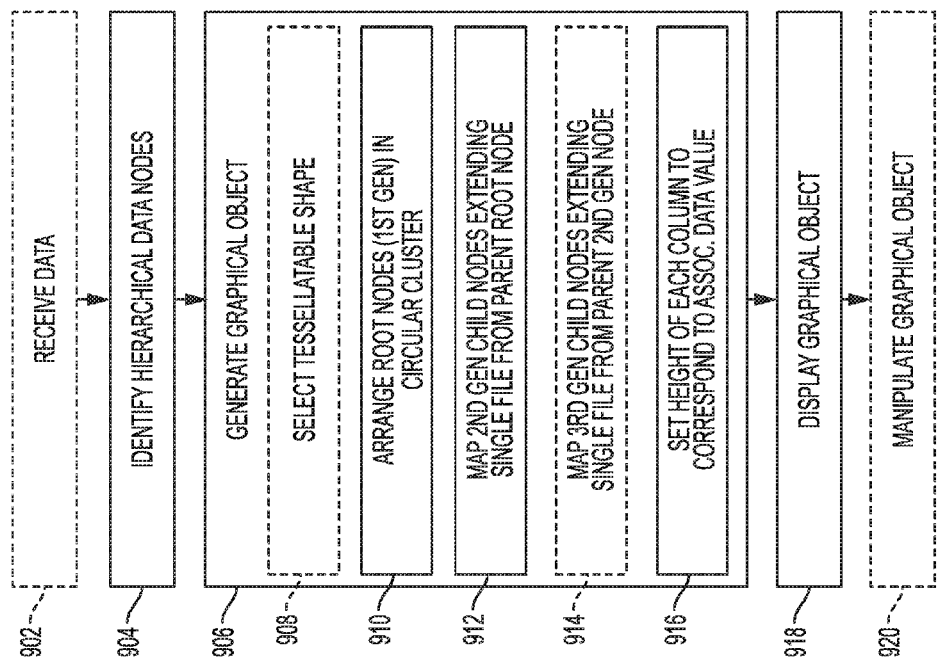
FIG. 20 is a flow chart depicting steps in an illustrative method for visualizing data using a tessellated column topology in accordance with aspects of the present disclosure.

This section describes a method for visualizing hierarchical data according to a tessellated column topology; see FIG. 20. Aspects of tessellated data visualization systems (see above descriptions), data processing systems, and/or computer network systems may be utilized in the method steps described below. Where appropriate, reference may be made to components and systems (described herein) that may be used in carrying out each step. These references are for illustration, and are not intended to limit the possible ways of carrying out any particular step of the method.

FIG. 20 is a flowchart illustrating operations performed by one embodiment, and may not recite the complete process or all steps of the program. FIG. 20 depicts multiple steps of a method, generally indicated at 900, which may be performed in conjunction with data visualization systems according to aspects of the present disclosure. Although various steps of method 900 are described below and depicted in FIG. 20, the steps need not necessarily all be performed, and in some cases may be performed in a different order than the order shown.

The following steps are configured to be performed at least in part by a data processing system and/or at least in part by a computer network (see FIGS. 22 and 23, and detailed descriptions below). Accordingly, they may be interpreted as programmed instructions to be executed by one or more processors. Data being operated on may be disposed at a local or remote data store.

At step 902, one or more data elements of a data set (e.g., a hierarchical data set) are received by the system. Each of these data elements may include an associated value, e.g., a numerical value. Receiving the one or more data elements may include receiving data node relationship information. For example, parent-child and/or sibling relationship information may be provided with or as part of the data set. For example, hierarchy indices, time stamps, categorizations, and the like may be received in step 902.

At step 904, hierarchical data nodes are identified and/or recognized by the system. Specifically, data nodes may each include one or more data elements combined according to selected rules to produce a quantitative value. For example, a data node may be the sum of all transactions occurring within a specific business department. Quantitative values may include percentages, dollar amounts, population counts, delta values, results of formulaic expressions, and/or the like. In some examples, the quantitative value associated with a data node may be non-numerical. For example, a quantitative value may be selected from a set of defined ranges, such as low/medium/high or cold/warm/hot, or letter grades, such as A/B/C/D/F, in which each designation equates to a defined quantity or range of numerical values.

In addition to a value, each data node may also have a relationship to one or more other data nodes. These relationships include parent-child relationships indicating which child nodes may be combined to produce which parent nodes. Child nodes having the same parent may be referred to as sibling nodes. A node that has no parents may be referred to as a root node. A node that has no children may be referred to as a leaf node. Step 904 includes identifying root nodes and one or more generations of child nodes depending from those root nodes.

Data nodes and/or their associated relationships may be identified by any suitable method. In some examples, data nodes and/or relationships may be predefined and/or inherent in the data set, in which case information identifying the nodes and relationships may be received with the data in step 902 (or separately). In some examples, data nodes and/or relationships may be identified dynamically by the system, and/or by a user. Identifying information may include the use of one or more indices, such as the commonly used decimal-point hierarchical indexing system, also referred to as dot notation (e.g., 1.1, 2.4.1, etc.).

At step 906, a multi-dimensional graphical object (i.e., a visualization) is generated by the system to illustrate the one or more relationships and to illustrate a respective quantitative value associated with each of the data nodes. Some or all of the data nodes may be represented. For example, a subset of the data nodes may be illustrated. In some examples, the selected data nodes may be modified (e.g., aggregated, or combined according to selected rules or operations), and the resulting modified data nodes may be illustrated.

Generating the graphical object includes the following steps:

At step 908, a tessellatable shape is selected by the system. For example, a tessellatable shape may be selected based on user preferences. For example, a hexagonal shape may be selected. In some examples, the system may have a defined, preselected, and/or default tessellatable shape, in which case step 908 may be bypassed or optional.

At step 910, one or more of the root nodes identified in step 904 are represented as columns arranged in a circular, edge-to-edge cluster, each of the columns having the tessellatable cross-sectional shape selected in step 908 (or predefined or preselected, e.g., as in a default tessellatable shape). The columns are arranged such that the cross-sectional shape lies in an X-Y plane. The height of each column is defined as its height relative to the X-Y plane along a Z-axis orthogonal to the X-Y plane. In some examples, a gap may be present between the proximal edges of any two adjacent columns. The size of this gap may be selectable and/or variable. If a hexagonal shape is selected in step 908, then hexagonal node locations may be arranged in six hexagonal node locations to form a substantially circular formation or cluster. Fewer than six such columns may be represented in these six node locations.

At step 912, one or more second generation child nodes may be represented (e.g., mapped) in relation to the associated parent root node. The second generation child nodes are represented as columns, and may have the same cross sectional shape as the parent root nodes. If the second generation child nodes have the same cross sectional shape as the root nodes, the nodes may all be mapped onto the same planar, tessellated grid. The second generation child nodes are mapped onto the graphical display such that the child nodes extend single file from one unoccupied edge of the parent root node. In some examples, the child nodes have edge-to-edge adjacency. In some examples, the child nodes extend radially from the parent root node. If the parent root node has a hexagonal shape (i.e., six edges), the second generation child nodes may extend from any one of the three outer edges (two other edges being occupied by adjacent root nodes and the remaining inner edge facing toward the middle of the cluster). Choosing the middle of the three outer edges will cause the child nodes to extend radially outward. Choosing one of the other outer edges will cause the child nodes to extend in a clockwise or counterclockwise direction, when viewed normal to the X-Y plane.

Optional step 914 includes mapping one or more third generation child nodes in relation to their parent, which is one of the second generation child nodes. The third generation child nodes are represented as columns, and may have the same cross sectional shape as the root nodes. For the purposes of this mapping, the second generation child nodes are considered to have two opposing edges occupied, whether or not parent or sibling nodes are present at those edges. Accordingly, the third generation child nodes are mapped onto the graphical display such that these child nodes extend single file from one unoccupied edge of their respective parent node. In some examples, the child nodes have edge-to-edge adjacency. In some examples, all third generation child nodes for any given parent node are mapped from the same relative edge on each respective parent node.

At step 916, the height of each column is set to correspond to its respective associated data node value. Positive values may result in columns having a height that extends in a positive Z direction with respect to the X-Y plane. Negative values may result in columns having a height that extends in a negative Z direction with respect to the X-Y plane. In some examples, column heights may extend along a same Z direction corresponding to an absolute value of the underlying data, and positive or negative values may be distinguished in some other fashion, e.g., by color coding. Step 916 may be performed simultaneously with mapping of each column.

At step 918, the resulting multi-dimensional graphical object is transmitted for display. For example, the graphical object may be transmitted to a GUI. For example, the graphical object may be displayed on a screen. In some examples, the graphical object may be holographically projected into real space.

At optional step 920, the resulting multi-dimensional graphical object may be manipulated. For example, the system may receive commands from a user (e.g., via a GUI) to rotate, zoom, pan, etc., and the system may respond accordingly.

Illustrative Algorithm to Generate Rose Topology

Figure 21:
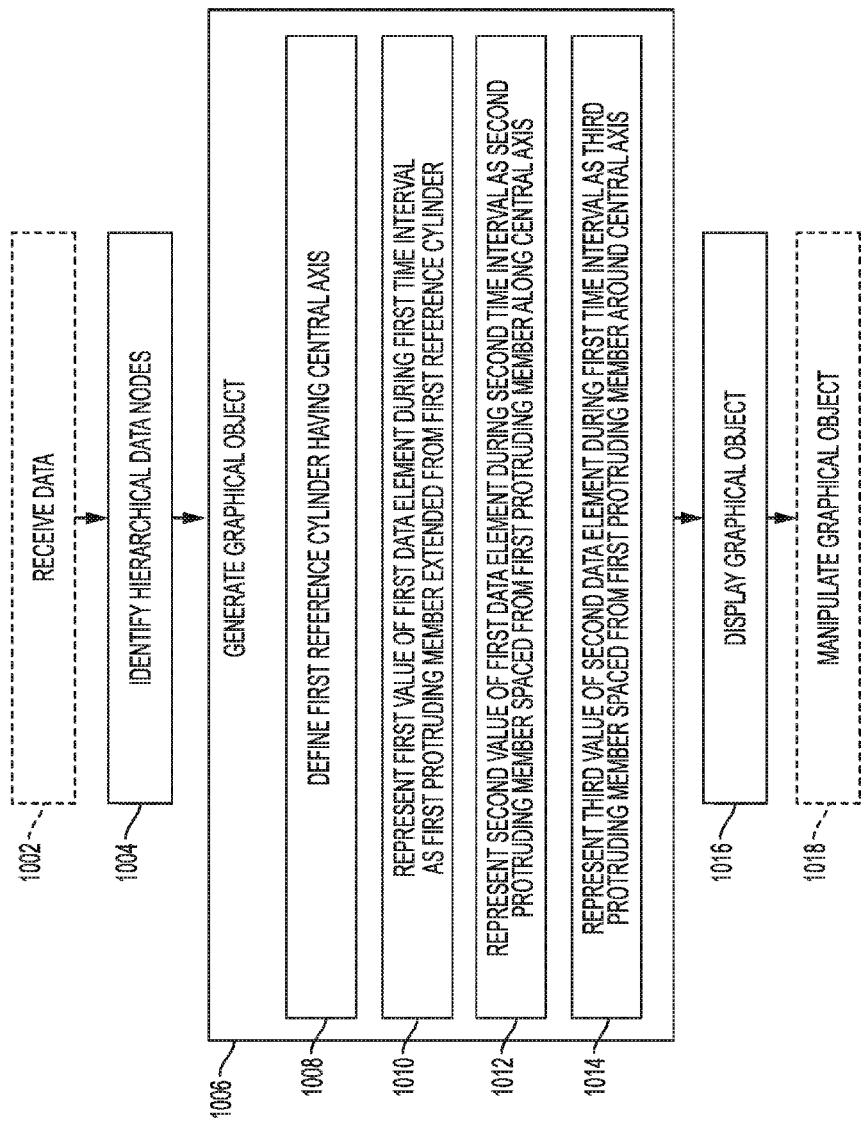
FIG. 21 is a flow chart depicting steps in an illustrative method for visualizing data using a rose topology in accordance with aspects of the present disclosure.

This section describes a method for visualizing hierarchical data according to a rose topology; see FIG. 21. Aspects of tessellated data visualization systems (see above descriptions), data processing systems, and/or computer network systems may be utilized in the method steps described below. Where appropriate, reference may be made to components and systems (described herein) that may be used in carrying out each step. These references are for illustration, and are not intended to limit the possible ways of carrying out any particular step of the method.

FIG. 21 is a flowchart illustrating operations performed by one embodiment, and may not recite the complete process or all steps of the program. FIG. 21 depicts multiple steps of a method, generally indicated at 1000, which may be performed in conjunction with data visualization systems according to aspects of the present disclosure. Although various steps of method 1000 are described below and depicted in FIG. 21, the steps need not necessarily all be performed, and in some cases may be performed in a different order than the order shown.

The following steps are configured to be performed at least in part by a data processing system and/or at least in part by a computer network (see FIGS. 22 and 23, and detailed descriptions below). Accordingly, they may be interpreted as programmed instructions to be executed by one or more processors. Data being operated on may be disposed at a local or remote data store.

At step 1002, one or more data elements of a hierarchical data structure are received, wherein the hierarchical data structure includes root node data, at least one level of child node data, and relationships between the root node data and the at least one level of child node data. Each of the one or more data elements includes a plurality of values corresponding to a plurality of time intervals.

At step 1004, hierarchical data nodes are identified and/or recognized by the system. This step may be substantially identical to step 904 above.

Step 1006 includes generating, via the processing device, a three-dimensional virtual object to illustrate the plurality of values of the one or more data elements corresponding to the plurality of time intervals.

Generating the three-dimensional virtual object includes:

At step 1008, defining a first reference cylinder having a first radius, a central axis, and a plurality of axial locations along the central axis;

At step 1010, representing a first value of a first data element during a first time interval as a first protruding member extending from the first radius of the first reference cylinder at a first axial and angular location, the first protruding member having a radial extent from the first radius corresponding to the value of the first data element during the first time interval;

At step 1012, representing a second value of the first data element during a second time interval as a second protruding member extending from the first radius of the first reference cylinder at a second axial and angular location, the second time later than the first time, the second axial and angular location spaced from the first axial and angular location along the central axis, the second protruding member having a radial extent from the first radius corresponding to the value of the first data element during the second time interval; and At step 1014, representing a third value of a second data element during the first time interval as a third protruding member extending from the first radius of the first reference cylinder at a third axial and angular location, the third axial and angular location spaced from the first axial and angular location around the central axis, the third protruding member having a radial extent from the first radius corresponding to the value of the second data element during the first time interval.

Step 1016 includes transmitting, via the processing device, the three-dimensional virtual object for presentation on a display.

Step 1018 includes manipulating the graphical object, e.g., using a graphical user interface. See description of step 920 above.

Method 1000 may be continued by representing additional data elements around a circumference of the first reference cylinder at additional times along a height of the cylinder. The data elements represented around the first reference cylinder's circumference may include any combination of root nodes, parent nodes, and child nodes of the hierarchical data set. In some examples, the represented data may be siblings of a common parent node. In some example, more than one generation of hierarchical data may be represented on the first reference cylinder. Nodes represented around the cylinder circumference may also be represented along the cylinder height, thereby showing the progress of the nodes over any appropriate number of time intervals.

Method 1000 may be continued by defining a second reference cylinder having a second radius greater than the first radius, the same central axis as the first reference cylinder, and a plurality of axial locations along the central axis. Additional data elements may be represented around and along the second reference cylinder in a similar manner as with respect to the first reference cylinder.

The second reference cylinder may include representations of additional data elements or additional generations of data elements from the hierarchical data set. In some examples, child nodes of a parent node may be disposed on the second reference cylinder within the same angular span around the central axis as their parent node on the first reference cylinder. In some examples the data represented on the second reference cylinder may not have familial relationships with the data represented on the first reference cylinder. Any appropriate number of additional coaxial reference cylinders may be added to the virtual object in a similar manner.

Method 1000 may be continued by representing the value of an additional data element or of an expression, at each of the time intervals, as a plurality of central disks disposed within the first reference cylinder and having the central axis as a symmetry axis. Each central disk may represent a data element, such as a parent node or a root node, or may represent an expression based on the data represented on the one or more reference cylinders (or elsewhere). Each central disk may be sized to have a radial extent from the central axis corresponding to the value of the data element or expression during the corresponding time interval. In some examples, the reference cylinders may be resized as needed to accommodate the central disks therein.

Image-Based Data Derivation

In some examples, one or more of the visual topologies described herein may exist (or be caused to exist) only as a graphical object (e.g., a 3-D image) isolated from the underlying data. It may be useful, in these and other situations, to be able to reverse engineer the data based on the graphical object (e.g., image) alone. In some examples, as may be the case with cutting edge memory storage techniques, it may be more efficient or otherwise advantageous to store the information as an image, series of images, holographic image, or multi-dimensional image, as opposed to storing the underlying data and dynamically generating the graphical object.

Accordingly, dynamic generation of data from the graphical object may be facilitated by providing a way to translate or interpret the visual image into numerical information. For example, a scale or other measuring information may be displayed with the visual image, or embedded in it. For example, a scale may indicate that a certain amount of visual "volume" in a column corresponds to a certain numerical quantity. Such a scale may be used to visually assess the displayed columns and ascertain a (possibly estimated) underlying value. Applying the scale to each column in the displayed graphical object, and possibly cross-referencing known relationships (e.g., children whose values are known to add up to a parent's value), may facilitate a translation of the image into the underlying data.

In a similar method, the items displayed in a graphical object may be shown as a collection of defined building blocks (see, e.g., FIG. 17). In examples having this feature, derivation of underlying values may be performed in a straightforward manner, by counting or extrapolating the number of such blocks and translating the block count into a numerical value. Such methods may introduce rounding errors, depending on the granularity of the building blocks with respect to the data.

In some examples, scaling information, or even the underlying data itself, may be incorporated into the image using machine-readable encoded imagery. For example, one or more 2D barcodes (e.g., QR Codes) may be included in the generated image. Scaling information and/or some or all of the underlying data may be encoded in these barcodes.

Illustrative Data Processing System

As shown in FIG. 21, this example describes a data processing system 1200 (also referred to as a computer) in accordance with aspects of the present disclosure. In this example, data processing system 1200 is an illustrative data processing system suitable for implementing aspects of data visualization systems according to the present teachings. More specifically, in some examples, devices that are embodiments of data processing systems (e.g., smart phones, tablets, personal computers) may be used to perform methods and/or display and interact with graphical objects, such as those in the systems and methods described above.

In this illustrative example, data processing system 1200 includes communications framework 1202. Communications framework 1202 provides communications between processor unit 1204, memory 1206, persistent storage 1208, communications unit 1210, input/output (I/O) unit 1212, and display 1214. Memory 1206, persistent storage 1208, communications unit 1210, input/output (I/O) unit 1212, and display 1214 are examples of resources accessible by processor unit 1204 via communications framework 1202.

Processor unit 1204 serves to run instructions that may be loaded into memory 1206. Processor unit 1204 may be a number of processors, a multi-processor core, or some other type of processor, depending on the particular implementation. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and other suitable information either on a temporary basis or a permanent basis.

Storage devices 1216 also may be referred to as computer-readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output (I/O) unit 1212 allows for input and output of data with other devices that may be connected to data processing system 1200. For example, input/output (I/O) unit 1212 may provide a connection for user input through a keyboard, a mouse, and/or some other suitable input device. Further, input/output (I/O) unit 1212 may send output to a printer. Display 1214 provides a mechanism to display information to a user.

Instructions for the operating system, applications, and/or programs may be located in storage devices 1216, which are in communication with processor unit 1204 through communications framework 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program instructions, program code, computer usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these examples. In one example, computer-readable media 1220 may be computer-readable storage media 1224 or computer-readable signal media 1226.

Computer-readable storage media 1224 may include, for example, an optical or magnetic disk that is inserted or placed into a drive or other device that is part of persistent storage 1208 for transfer onto a storage device, such as a hard drive, that is part of persistent storage 1208. Computer-readable storage media 1224 also may take the form of a persistent storage, such as a hard drive, a thumb drive, or a flash memory, that is connected to data processing system 1200. In some instances, computer-readable storage media 1224 may not be removable from data processing system 1200.

In these examples, computer-readable storage media 1224 is a physical or tangible storage device used to store program code 1218 rather than a medium that propagates or transmits program code 1218. Computer-readable storage media 1224 is also referred to as a computer-readable tangible storage device or a computer-readable physical storage device. In other words, computer-readable storage media 1224 is a media that can be touched by a person.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer-readable signal media 1226 for use within data processing system 1200. For instance, program code stored in a computer-readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 21 can be varied from the illustrative examples shown. The different embodiments may be implemented using any hardware device or system capable of running program code. As one example, data processing system 1200 may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications framework 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or both transmit and receive data. Communications unit 1210 may be, for example, a modem or a network adapter, two network adapters, or some combination thereof. Further, a memory may be, for example, memory 1206, or a cache, such as that found in an interface and memory controller hub that may be present in communications framework 1202.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Illustrative Computer Network

Figure 22:
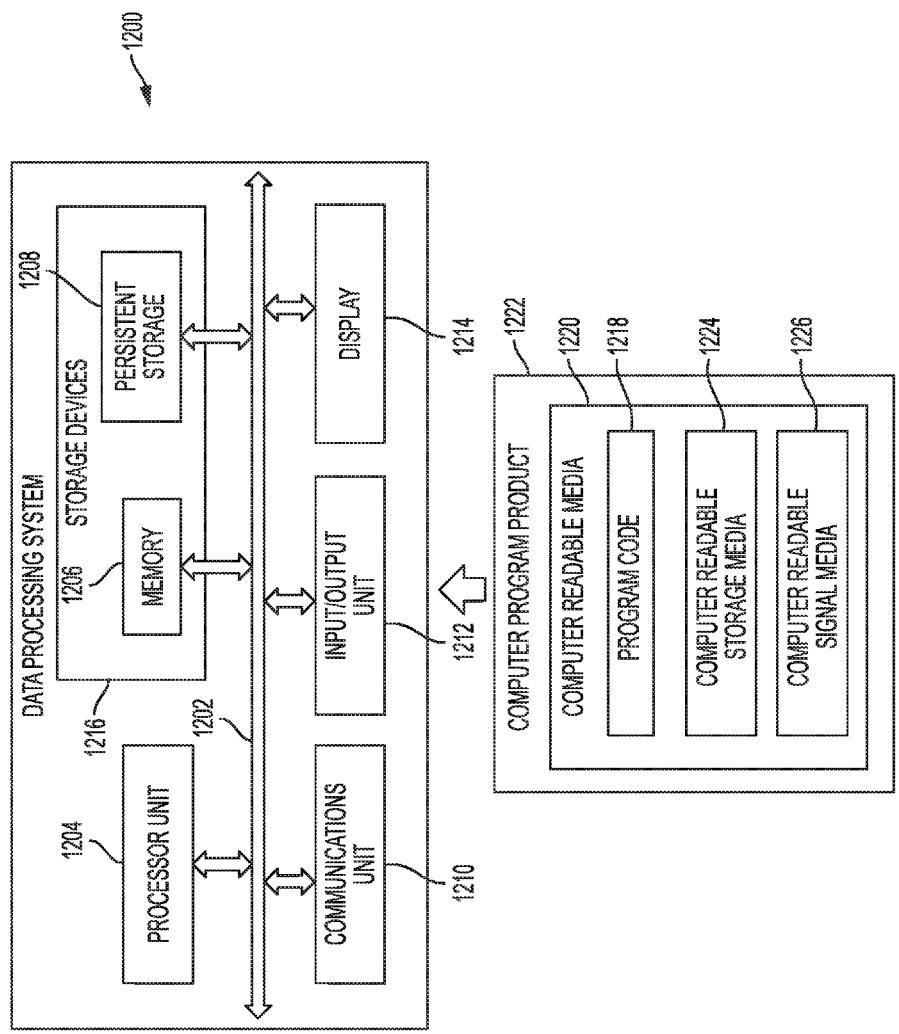
FIG. 22 is a schematic diagram of various components of an illustrative data processing system.
Figure 23:
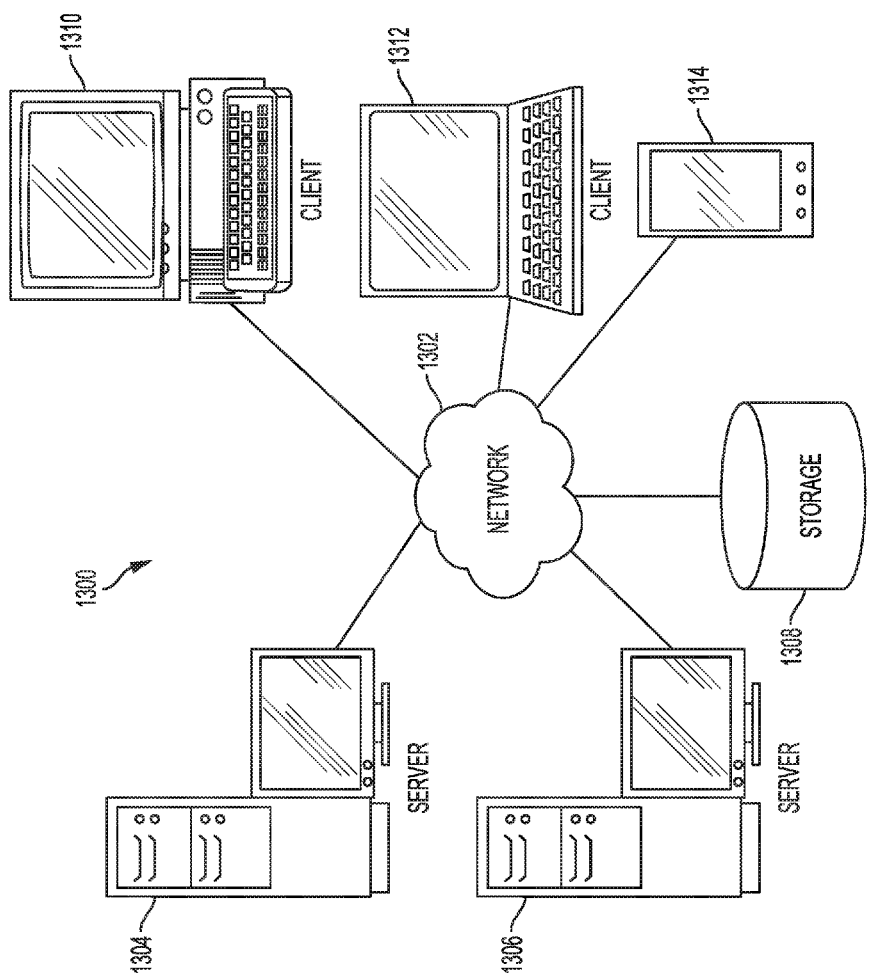
FIG. 23 is a schematic representation of an illustrative distributed data processing system.

As shown in FIG. 22, this example describes a general network data processing system 1300, interchangeably termed a network, a computer network, a network system, a distributed network, a distributed data processing system, or the like, in which illustrative embodiments of data visualization systems may be included. For example, various aspects of the data visualization systems (and related methods) may be implemented in or communicated using a computer network. It should be appreciated that FIG. 22 is provided as an illustration of one implementation and is not intended to imply any limitation with regard to environments in which different embodiments may be implemented. Many modifications to the depicted environment may be made.

Network data processing system 1300 is a network of computers, each of which is an example of data processing system 1200, and other components. Network data processing system 1300 may include network 1302, which is a medium configured to provide communications links between various devices and computers connected together within network data processing system 1300. Network 1302 may include connections such as wired or wireless communication links, fiber optic cables, and/or any other suitable medium for transmitting and/or communicating data between network devices, or any combination thereof.

In the depicted example, a first network device 1304 and a second network device 1306 connect to network 1302, as does an electronic storage device 1308. Network devices 1304 and 1306 are each examples of data processing system 1200, described above. In the depicted example, devices 1304 and 1306 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 1310, a client laptop or tablet 1312, and/or a client smartdevice 1314, may connect to network 1302. Each of these devices is an example of data processing system 1200, described above regarding FIG. 21. Client electronic devices 1310, 1312, and 1314 may include, for example, one or more personal computers, network computers, and/or mobile computing devices such as personal digital assistants (PDAs), smart phones, handheld gaming devices, wearable devices, and/or tablet computers, and the like. In the depicted example, server 1304 provides information, such as boot files, operating system images, and applications to one or more of client electronic devices 1310, 1312, and 1314. Client electronic devices 1310, 1312, and 1314 may be referred to as "clients" with respect to a server such as server computer 1304. Network data processing system 1300 may include more or fewer servers and clients or no servers or clients, as well as other devices not shown.

Client smartdevice 1314 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smartdevices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near field communications (NFC), BLUETOOTH®, WiFi, or mobile broadband networks. Wireless connectively may be established among smartdevices, smartphones, computers, and other devices to form a mobile network where information can be exchanged.

Program code located in system 1300 may be stored in or on a computer recordable storage medium, such as persistent storage 108 in Example 1, and may be downloaded to a data processing system or other device for use. For example, program code may be stored on a computer recordable storage medium on server computer 1304 and downloaded for use to client 1310 over network 1302 for use on client 1310.

Network data processing system 1300 may be implemented as one or more of a number of different types of networks. For example, system 1300 may include an intranet, a local area network (LAN), a wide area network (WAN), or a personal area network (PAN). In some examples, network data processing system 1300 includes the Internet, with network 1302 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 1300 may be referred to as a "cloud." In those examples, each server 1304 may be referred to as a cloud computing node, and client electronic devices may be referred to as cloud consumers, or the like. FIG. 22 is intended as an example, and not as an architectural limitation for any illustrative embodiments.

Selected Examples

This section describes additional aspects and features of data visualization systems and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method, implemented in a data processing system, the method comprising:

receiving, using a data processing system, one or more elements of a data set;

identifying, using a processor of the data processing system, a plurality of hierarchical data nodes of the data set, each of the data nodes having an associated quantitative value, and one or more relationships between the data nodes, such that identifying the data nodes includes identifying a plurality of root nodes and one or more generations of child nodes;

generating, using the data processing system, a multi-dimensional graphical object illustrating the quantitative values of the data nodes and the one or more relationships between the data nodes;

wherein generating the graphical object includes:

representing the plurality of root nodes as a circular, edge-to-edge cluster of columns, each such root node column having a tessellatable cross-sectional shape;

representing, adjacent to a first root node of the plurality of root nodes, one or more first child nodes having the first root node as a parent, the one or more first child nodes represented as respective child node columns extending single file from one unoccupied edge of the first root node; and setting a respective height of each root node column and of each child node column, such that the respective height corresponds to the quantitative value of the data node represented by the respective column; and transmitting the graphical object for display.

A1. The method of A0, wherein the circular, edge-to-edge cluster of root node columns defines an X-Y plane, the respective heights of each root node column being defined along a Z axis running orthogonal to the X-Y plane.

A2. The method of A1, wherein the tessellatable cross-sectional shape is defined in the X-Y plane.

A3. The method of A0, wherein the root node columns and the child node columns are represented isometrically.

A4. The method of A0, wherein generating the graphical object further includes representing, adjacent to a first node of the first child nodes, one or more second child nodes having the first node as a parent, the one or more second child nodes represented as respective columns extending single file from one unoccupied edge of the first node.

A5. The method of A4, wherein generating the graphical object further includes representing, adjacent to a second node of the first child nodes, one or more third child nodes having the second node as a parent, the one or more third child nodes represented as respective columns extending single file from one unoccupied edge of the second node, such that the third child nodes extend from the same relative edge of the second node as the second child nodes extend from the first node.

A6. The method of A5, wherein the circular, edge-to-edge cluster of root node columns defines an X-Y plane, and the second child nodes extend clockwise from the first node and the third child nodes extend clockwise from the second node, as viewed from a vantage point normal to the X-Y plane.

A7. The method of A0, wherein the first child nodes each have the same cross-sectional shape as the root node columns.

A8. The method of A0, wherein each of the root node columns is separated from adjacent root node columns by a gap.

A9. The method of A0, wherein the tessellatable cross-sectional shape is a hexagon.

A10. The method of A0, wherein receiving the one or more elements of the data set includes receiving data node relationship information.

A11. The method of A0, further including displaying the graphical object three-dimensionally in a graphical user interface.

B0. A data processing system for visualizing hierarchical data, the system comprising:

a processor;

a memory; and a visualization program including a plurality of instructions stored in the memory and executable by the processor to:

receive one or more elements of a data set;

identify a plurality of hierarchical data nodes of the data set, each of the data nodes having an associated quantitative value, and one or more relationships between the data nodes, such that identifying the data nodes includes identifying a plurality of root nodes and one or more generations of child nodes;

generate a multi-dimensional graphical object illustrating the quantitative values of the data nodes and the one or more relationships between the data nodes, wherein generating the graphical object includes instructions to:

represent the plurality of root nodes as a circular, edge-to-edge cluster of columns, each such root node column having a tessellatable cross-sectional shape;

represent, adjacent to a first root node of the plurality of root nodes, one or more first child nodes having the first root node as a parent, the one or more first child nodes represented as respective child node columns extending single file from one unoccupied edge of the first root node; and set a respective height of each root node column and of each child node column, such that the respective height corresponds to the quantitative value of the data node represented by the respective column; and transmit the graphical object for presentation on a display.

B1. The system of B0, further including a display having a graphical user interface (GUI), the display being in communication with the processor such that the display is configured to receive the graphical object and present the graphical object in the GUI.

B2. The system of B1, wherein the display is remote from the processor.

B3. The system of B0, wherein the graphical object is transmitted for presentation over a data processing network.

B4. The system of B0, wherein the circular, edge-to-edge cluster of root node columns defines an X-Y plane, the respective heights of each root node column being defined along a Z axis running orthogonal to the X-Y plane.

B5. The system of B4, wherein the tessellatable cross-sectional shape is defined in the X-Y plane.

B6. The system of B0, wherein the root node columns and the child node columns are represented isometrically.

B7. The system of B0, wherein the plurality of instructions are further executable by the processor to:

represent, adjacent to a first node of the first child nodes, one or more second child nodes having the first node as a parent, the one or more second child nodes represented as respective columns extending single file from one unoccupied edge of the first node.

B8. The system of B7, wherein the plurality of instructions are further executable by the processor to represent, adjacent to a second node of the first child nodes, one or more third child nodes having the second node as a parent, the one or more third child nodes represented as respective columns extending single file from one unoccupied edge of the second node, such that the third child nodes extend from the same relative edge of the second node as the second child nodes extend from the first node.

B9. The system of B8, wherein the circular, edge-to-edge cluster of root node columns defines an X-Y plane, and the second child nodes extend clockwise from the first node and the third child nodes extend clockwise from the second node, as viewed from a vantage point normal to the X-Y plane.

B10. The system of B0, wherein the first child nodes each have the same cross-sectional shape as the root node columns.

B11. The system of B0, wherein each of the root node columns is separated from adjacent root node columns by a gap.

B12. The system of B0, wherein the tessellatable cross-sectional shape is a hexagon.

B13. The system of B0, wherein receiving the one or more elements of the data set includes receiving data node relationship information.

B14. The system of B0, wherein the plurality of instructions are further executable by the processor to display the graphical object three-dimensionally in a graphical user interface.

C0. A computer program product for visualizing hierarchical data, the computer program product comprising a non-transitory computer-readable storage medium having computer-readable program code embodied therewith, the computer readable program code configured to cause a data processing system to generate a graphical object, the computer readable program code comprising:

at least one instruction to identify a plurality of hierarchical data nodes of a data set, each of the data nodes having an associated quantitative value, and one or more relationships between the data nodes, such that identifying the data nodes includes identifying a plurality of root nodes and one or more generations of child nodes;

at least one instruction to generate a multi-dimensional graphical object illustrating the quantitative values of the data nodes and the one or more relationships between the data nodes, wherein generating the graphical object includes instructions to:

represent the plurality of root nodes as a circular, edge-to-edge cluster of columns, each such root node column having a tessellatable cross-sectional shape;

represent, adjacent to a first root node of the plurality of root nodes, one or more first child nodes having the first root node as a parent, the one or more first child nodes represented as respective child node columns extending single file from one unoccupied edge of the first root node; and set a respective height of each root node column and of each child node column, such that the respective height corresponds to the quantitative value of the data node represented by the respective column; and at least one instruction to transmit the graphical object for presentation on a display.

C1. The computer program product of C0, wherein the graphical object is transmitted for presentation over a data processing network.

C2. The computer program product of C0, wherein the circular, edge-to-edge cluster of root node columns defines an X-Y plane, the respective heights of each root node column being defined along a Z axis running orthogonal to the X-Y plane.

C3. The computer program product of C2, wherein the tessellatable cross-sectional shape is defined in the X-Y plane.

C4. The computer program product of C0, wherein the root node columns and the child node columns are represented isometrically.

C5. The computer program product of C0, the computer readable program code further comprising at least one instruction to represent, adjacent to a first node of the first child nodes, one or more second child nodes having the first node as a parent, the one or more second child nodes represented as respective columns extending single file from one unoccupied edge of the first node.

C6. The computer program product of C5, the computer readable program code further comprising at least one instruction to represent, adjacent to a second node of the first child nodes, one or more third child nodes having the second node as a parent, the one or more third child nodes represented as respective columns extending single file from one unoccupied edge of the second node, such that the third child nodes extend from the same relative edge of the second node as the second child nodes extend from the first node.

C7. The computer program product of C6, wherein the circular, edge-to-edge cluster of root node columns defines an X-Y plane, and the second child nodes extend clockwise from the first node and the third child nodes extend clockwise from the second node, as viewed from a vantage point normal to the X-Y plane.

C8. The computer program product of C0, wherein the first child nodes each have the same cross-sectional shape as the root node columns.

C9. The computer program product of C0, wherein each of the root node columns is separated from adjacent root node columns by a gap.

C10. The computer program product of C0, wherein the tessellatable cross-sectional shape is a hexagon.

C11. The computer program product of C0, wherein receiving the one or more elements of the data set includes receiving data node relationship information.

C12. The computer program product of C0, wherein the plurality of instructions are further executable by the processor to display the graphical object three-dimensionally in a graphical user interface.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method, implemented in a data processing system, the method comprising:
   receiving, using a data processing system, one or more elements of a data set;
   identifying, using a processor of the data processing system, a plurality of hierarchical data nodes of the data set, each of the data nodes having an associated quantitative value, and one or more relationships between the data nodes, such that identifying the data nodes includes identifying a plurality of root nodes and one or more generations of child nodes;
   generating, using the data processing system, a multi-dimensional graphical object illustrating the quantitative values of the data nodes and the one or more relationships between the data nodes;
   wherein generating the graphical object includes:
      representing the plurality of root nodes as a circular, edge-to-edge cluster of columns, each such root node column having a tessellatable cross-sectional shape;
      representing, adjacent to a first root node of the plurality of root nodes, one or more first child nodes having the first root node as a parent, the one or more first child nodes represented as respective child node columns extending single file from one unoccupied edge of the first root node; and
      setting a respective height of each root node column and of each child node column, such that the respective height corresponds to the quantitative value of the data node represented by the respective column; and
   transmitting the graphical object for display.

2. The method of claim 1, wherein the circular, edge-to-edge cluster of root node columns defines an X-Y plane, the respective heights of each root node column being defined along a Z axis running orthogonal to the X-Y plane.

3. The method of claim 1, wherein the root node columns and the child node columns are represented isometrically.

4. The method of claim 1, wherein generating the graphical object further includes representing, adjacent to a first node of the first child nodes, one or more second child nodes having the first node as a parent, the one or more second child nodes represented as respective columns extending single file from one unoccupied edge of the first node.

5. The method of claim 4, wherein generating the graphical object further includes representing, adjacent to a second node of the first child nodes, one or more third child nodes having the second node as a parent, the one or more third child nodes represented as respective columns extending single file from one unoccupied edge of the second node, such that the third child nodes extend from the same relative edge of the second node as the second child nodes extend from the first node.

6. The method of claim 1, wherein the first child nodes each have the same cross-sectional shape as the root node columns.

7. The method of claim 1, wherein each of the root node columns is separated from adjacent root node columns by a gap.

8. The method of claim 1, wherein the tessellatable cross-sectional shape is a hexagon.

9. The method of claim 1, wherein receiving the one or more elements of the data set includes receiving data node relationship information.

10. A data processing system for visualizing hierarchical data, the system comprising:
    a processor;
    a memory; and
    a visualization program including a plurality of instructions stored in the memory and executable by the processor to:
    receive one or more elements of a data set;
    identify a plurality of hierarchical data nodes of the data set, each of the data nodes having an associated quantitative value, and one or more relationships between the data nodes, such that identifying the data nodes includes identifying a plurality of root nodes and one or more generations of child nodes;
    generate a multi-dimensional graphical object illustrating the quantitative values of the data nodes and the one or more relationships between the data nodes, wherein generating the graphical object includes instructions to:

represent the plurality of root nodes as a circular, edge-to-edge cluster of columns, each such root node column having a tessellatable cross-sectional shape;

represent, adjacent to a first root node of the plurality of root nodes, one or more first child nodes having the first root node as a parent, the one or more first child nodes represented as respective child node columns extending single file from one unoccupied edge of the first root node; and set a respective height of each root node column and of each child node column, such that the respective height corresponds to the quantitative value of the data node represented by the respective column; and transmit the graphical object for presentation on a display.

11. The system of claim 10, further including a display having a graphical user interface (GUI), the display being in communication with the processor such that the display is configured to receive the graphical object and present the graphical object in the GUI.

12. The system of claim 10, wherein the graphical object is transmitted for presentation over a data processing network.

13. The system of claim 10, wherein the circular, edge-to-edge cluster of root node columns defines an X-Y plane, the respective heights of each root node column being defined along a Z axis running orthogonal to the X-Y plane.

14. The system of claim 10, wherein the plurality of instructions are further executable by the processor to:

represent, adjacent to a first node of the first child nodes, one or more second child nodes having the first node as a parent, the one or more second child nodes represented as respective columns extending single file from one unoccupied edge of the first node.

15. The system of claim 14, wherein the plurality of instructions are further executable by the processor to represent, adjacent to a second node of the first child nodes, one or more third child nodes having the second node as a parent, the one or more third child nodes represented as respective columns extending single file from one unoccupied edge of the second node, such that the third child nodes extend from the same relative edge of the second node as the second child nodes extend from the first node.

16. The system of claim 10, wherein the first child nodes each have the same cross-sectional shape as the root node columns.

17. A computer program product for visualizing hierarchical data, the computer program product comprising a non-transitory computer-readable storage medium having computer-readable program code embodied therewith, the computer readable program code configured to cause a data processing system to generate a graphical object, the computer readable program code comprising:

at least one instruction to identify a plurality of hierarchical data nodes of a data set, each of the data nodes having an associated quantitative value, and one or more relationships between the data nodes, such that identifying the data nodes includes identifying a plurality of root nodes and one or more generations of child nodes;

at least one instruction to generate a multi-dimensional graphical object illustrating the quantitative values of the data nodes and the one or more relationships between the data nodes, wherein generating the graphical object includes instructions to:

represent the plurality of root nodes as a circular, edge-to-edge cluster of columns, each such root node column having a tessellatable cross-sectional shape;

represent, adjacent to a first root node of the plurality of root nodes, one or more first child nodes having the first root node as a parent, the one or more first child nodes represented as respective child node columns extending single file from one unoccupied edge of the first root node; and set a respective height of each root node column and of each child node column, such that the respective height corresponds to the quantitative value of the data node represented by the respective column; and at least one instruction to transmit the graphical object for presentation on a display.

18. The computer program product of claim 17, the computer readable program code further comprising at least one instruction to represent, adjacent to a first node of the first child nodes, one or more second child nodes having the first node as a parent, the one or more second child nodes represented as respective columns extending single file from one unoccupied edge of the first node.

19. The computer program product of claim 18, the computer readable program code further comprising at least one instruction to represent, adjacent to a second node of the first child nodes, one or more third child nodes having the second node as a parent, the one or more third child nodes represented as respective columns extending single file from one unoccupied edge of the second node, such that the third child nodes extend from the same relative edge of the second node as the second child nodes extend from the first node.

20. The computer program product of claim 17, wherein receiving the one or more elements of the data set includes receiving data node relationship information.

* * * * *